(12) United States Patent
Au et al.

(10) Patent No.: US 10,856,210 B2
(45) Date of Patent: *Dec. 1, 2020

(54) TRANSMISSION OF BSS LOAD ELEMENT IN WIRELESS LOCAL AREA NETWORK SYSTEM

(71) Applicant: Huawei Technologies Co., Ltd., Shenzhen (CN)

(72) Inventors: Kwok Shum Au, Ottawa (CA); Ming Gan, Shenzhen (CN); Xun Yang, Shenzhen (CN); Osama Aboul-Magd, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,815

(22) Filed: Jul. 5, 2019

(65) Prior Publication Data

US 2019/0335382 A1  Oct. 31, 2019

Related U.S. Application Data

(63) Continuation of application No. 15/910,963, filed on Mar. 2, 2018, now Pat. No. 10,349,340, which is a (Continued)

(51) Int. Cl.
*H04W 48/08* (2009.01)
*H04W 48/20* (2009.01)
(Continued)

(52) U.S. Cl.
CPC .......... *H04W 48/08* (2013.01); *H04L 5/0007* (2013.01); *H04W 48/20* (2013.01);
(Continued)

(58) Field of Classification Search
None
See application file for complete search history.

(56) References Cited

U.S. PATENT DOCUMENTS

2013/0301463 A1* 11/2013 Lee .................. H04W 48/08 370/252
2015/0271748 A1*  9/2015 Seok ................ H04W 48/20 370/338

(Continued)

FOREIGN PATENT DOCUMENTS

CN  102726103 A  10/2012
CN  103002547 A   3/2013
(Continued)

OTHER PUBLICATIONS

China Telecom, "Clarification on assistant information from WLAN," 3GPP TSG-RAN WG3 #85bis, R3-142367, Shanghai, China, Oct. 6, 10, 2014, 2 pages.

(Continued)

*Primary Examiner* — Shripal K Khajuria
(74) *Attorney, Agent, or Firm* — Slater Matsil, LLP

(57) ABSTRACT

A method and system for providing utilization information for a basic service set (BSS) in a wireless local area network system, performed by an access point, including generating and transmitting a BSS load element including a capable STA count field, a plurality of frequency and/or spatial stream underutilization fields, and a plurality of delta observable secondary channel utilization fields. The capable STA count field indicates a total number of STAs currently associated with the BSS. Each of the frequency and/or spatial stream underutilization fields indicates underutilized frequency and/or spatial stream domain resources on Orthogonal Frequency Division Multiple Access resource units for each channel, and each of the frequency and/or spatial stream underutilization fields is calculated based on (Continued)

RU size. Each of the delta observable secondary channel utilization fields indicates a utilization for a subband within a secondary channel calculated based on observable utilization on the corresponding secondary channel.

20 Claims, 14 Drawing Sheets

Related U.S. Application Data continuation-in-part of application No. PCT/CN2017/089548, filed on Jun. 22, 2017.

(51) Int. Cl.
```
H04W 72/04    (2009.01)
H04L 5/00     (2006.01)
H04W 74/00    (2009.01)
H04B 7/0452   (2017.01)
H04W 84/12    (2009.01)
H04W 48/16    (2009.01)
```

(52) U.S. Cl.
CPC ....... *H04W 72/042* (2013.01); *H04W 74/006* (2013.01); *H04B 7/0452* (2013.01); *H04L 5/0091* (2013.01); *H04W 48/16* (2013.01); *H04W 84/12* (2013.01)

(56) References Cited

U.S. PATENT DOCUMENTS

2015/0365952 A1* 12/2015 Wang ............... H04W 72/1252
                                                        370/329
2016/0316392 A1* 10/2016 Pantelidou ............ H04W 24/10

FOREIGN PATENT DOCUMENTS

| CN | 103686938 A | 3/2014 |
|----|-------------|--------|
| EP | 2361483 A2 | 8/2011 |

OTHER PUBLICATIONS

Gan, et al., "BSS Load Information in 802.11ax," 802.11-17/361 r0, Mar. 2017, 17 pages.

Hsu, et al., "BSS Load Information Element for 11ax," IEEE 802.11-17/0308r2, Mar. 2017, 25 pages.

IEEE P802.11ax/D1.3, Draft Standard for Information technology-Tele-communications and information exchange between systems Local and metropolitan area networks-Specific requirements; Part 11: Wireless LAN Medium Access Control (MAC) and Physical Layer (PHY) Specifications; Amendment 6: Enhancements for High Efficiency WLAN; IEEE P802.11ax/D1.3, Jun. 2017, 522 pages.

Gan, M., "LB225 CR for CID5917 and CID8165", Doc: IEEE 802.11-17/360 r0, Mar. 8, 2017, 4 Pages.

Gan, M., et al., "BSS Load Information in 802.11ax Follow up", doc.: IEEE 802.11-17/1397r0, Sep. 5, 2017, 20 Pages.

Hus, F., et al., "BSS Load Information Element for 11 ax", doc.: IEEE 802.11-17/0308r3, Jul. 10, 2017, 28 Pages.

Hsu, F., et al., "BSS Load Information Element for 11ax", doc.: IEEE 802.11-17/0308r0, Mar. 15, 2017, 18 Pages.

* cited by examiner

| Element ID | Length | MU-MIMO Capable STA Count | Spatial Stream Underutilization for primary 20MHz | Observable Secondary 20 MHz Utilization | Observable Secondary 40 MHz Utilization | Observable Secondary 80 MHz Utilization |
|---|---|---|---|---|---|---|
| 1 | 1 | 2 | 1 | 1 | 1 | 1 |

Octets:

FIG. 3A (Prior Art)

$$\text{The spatial stream underutilization} = \left\lfloor \frac{N_{max\_ss} \times T_{busy} - T_{utilized}}{N_{max\_ss} \times T_{busy}} \times 255 \right\rfloor \quad \text{equation (1)}$$

FIG. 3B

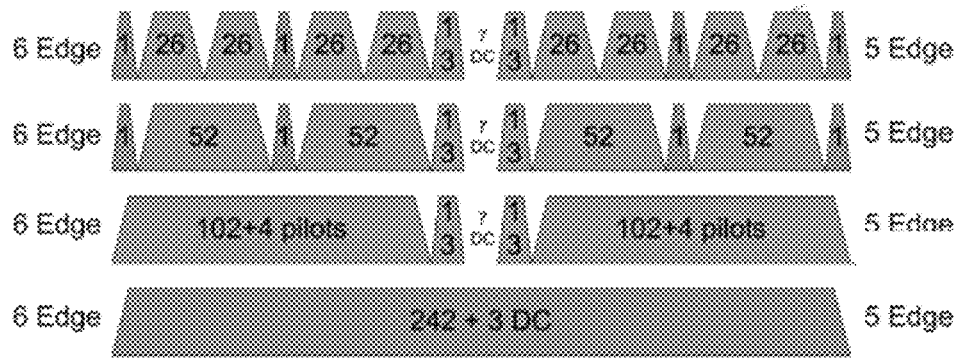
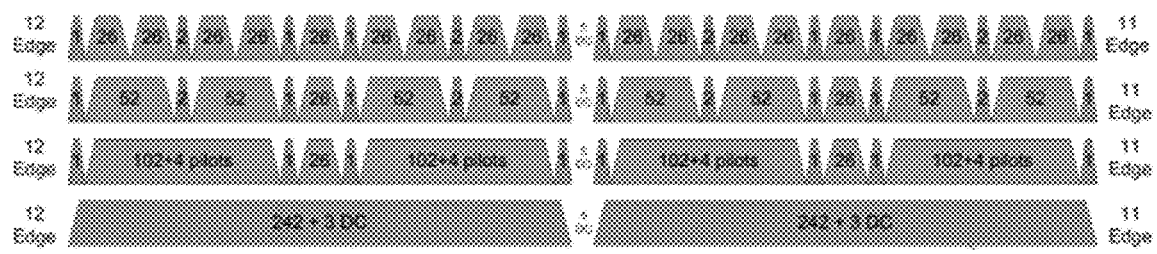
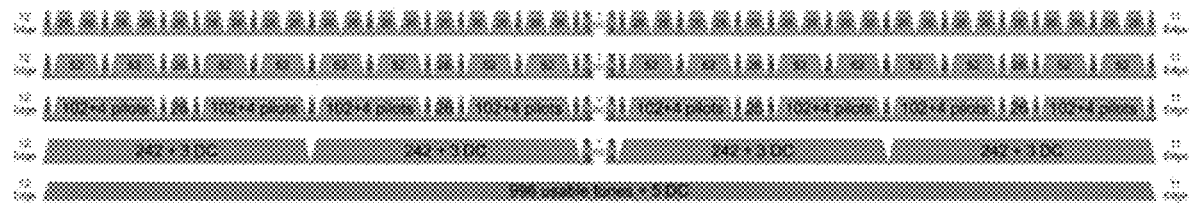
FIG. 4B $$\text{Frequency \& Spatial Stream Underutilization} = \left\lfloor \frac{\sum_{j=1}^{N1_{RU1}} RU1_j \times T_{busy} - \sum_{i=1}^{N} \left\{ \left( \sum_{j=1}^{N1_{RU1}} B_{j,i} \times RU1_j \right) \times T_i \right\}}{\sum_{j=1}^{N1_{RU1}} RU1_j \times T_{busy}} \times 255 \right\rfloor$$

$$\times \frac{\sum_{j=1}^{N1_{RU1}} RU1_j}{\sum_{j=1}^{N1_{RU1}} RU1_j + N_{maxSS} \times \sum_{j=1}^{N2_{RU2}} RU2_j}$$

$$+ \left\lfloor \frac{N_{maxSS} \times \sum_{j=1}^{N2_{RU2}} RU2_j \times T_{busy} - \sum_{i=1}^{N} \left\{ \left( \sum_{j=1}^{N2_{RU2}} N_{SS,j,i} \times RU2_j \right) \times T_i \right\}}{N_{maxSS} \times \sum_{j=1}^{N2_{RU2}} RU2_j \times T_{busy}} \times 255 \right\rfloor$$

$$\times \frac{N_{maxSS} \times \sum_{j=1}^{N2_{RU2}} RU2_j}{\sum_{j=1}^{N1_{RU1}} RU1_j + N_{maxSS} \times \sum_{j=1}^{N2_{RU2}} RU2_j}$$

equation (2)

or $$\text{Frequency \& Spatial Stream Underutilization} = \left\lfloor \frac{\sum_{j=1}^{N1_{RU1}} RU1_j \times T_{busy} - \sum_{i=1}^{N} \left\{ \left( \sum_{j=1}^{N1_{RU1}} B_{j,i} \times RU1_j \right) \times T_i \right\}}{\sum_{j=1}^{N1_{RU1}} RU1_j \times T_{busy}} \times 255 \right\rfloor \times a_i$$

$$+ \left\lfloor \frac{N_{maxSS} \times \sum_{j=1}^{N2_{RU2}} RU2_j \times T_{busy} - \sum_{i=1}^{N} \left\{ \left( \sum_{j=1}^{N2_{RU2}} N_{SS,j,i} \times RU2_j \right) \times T_i \right\}}{N_{maxSS} \times \sum_{j=1}^{N2_{RU2}} RU2_j \times T_{busy}} \times 255 \right\rfloor \times a_j$$

equation (3)

FIG. 5B $$\text{Frequency underutilization} = \left\lceil \frac{\sum_{j=1}^{N1_{RU1}} RU1_j \times T_{busy} - \sum_{i=1}^{N} \left\{ \left( \sum_{j=1}^{N1_{RU1}} B_{j,i} \times \overbrace{RU1_j}^{510} \right) \times T_i \right\}}{\sum_{j=1}^{N1_{RU1}} RU1_j \times T_{busy}} \times 255 \right\rceil \quad \text{equation (4)}$$

FIG. 5C

$$\text{Spatial Stream Underutilization} = \left\lceil \frac{N_{maxSS} \times \sum_{j=1}^{N2_{RU2}} RU2_j \times T_{busy} - \sum_{i=1}^{N} \left\{ \left( \sum_{j=1}^{N2_{RU2}} N_{SS,j,i} \times \overbrace{RU2_j}^{520} \right) \times T_i \right\}}{N_{maxSS} \times \sum_{j=1}^{N_{RU2}} RU2_j \times T_{busy}} \times 255 \right\rceil \quad \text{equation (5)}$$

FIG. 5D

Delta Observable the W1th 20 MHz of Secondary W2 Utilization =

$$\left\lceil \frac{T_{busy,w1,w2}}{dot11ChannelUtilizationBeaconIntervals \times dot11BeaconPeriod \times 1024} \times 255 \right\rceil - \text{Observable Secondary W2 Utilization} \quad \text{equation (6)}$$

(530)

or

Delta Observable the W1th 20 MHz of Secondary W2 Utilization =

$$\left\lceil \frac{T_{busy,w1,w2}}{dot11ChannelUtilizationBeaconIntervals \times dot11BeaconPeriod \times 1024} \times 255 \right\rceil / \text{Observable Secondary W2 Utilization} \quad \text{equation (7)}$$

Observable the W1th 20 MHz of Secondary W2 Utilization =

$$\left\lceil \frac{T_{busy,w1,w2}}{dot11ChannelUtilizationBeaconIntervals \times dot11BeaconPeriod \times 1024} \times 255 \right\rceil \quad \text{equation (8)}$$

FIG. 5F

TRANSMISSION OF BSS LOAD ELEMENT IN WIRELESS LOCAL AREA NETWORK SYSTEM

CROSS-REFERENCE TO RELATED APPLICATIONS

This application is a continuation of U.S. patent Publication Ser. No. 15/910,963, entitled "Transmission of BSS Load Element in Wireless Local Area Network System," filed on Mar. 2, 2018, which is a continuation-in-part of PCT Patent Application No. PCT/CN2017/089548, entitled "Transmission of BSS Load Element in Wireless Local Area Network System," filed on Jun. 22, 2017, which applications are hereby incorporated herein by reference.

TECHNICAL FIELD

The present disclosure relates to wireless local area network (WLAN) communications, in particular methods and systems for transmitting a basic service set (BSS) load element in a WLAN system.

BACKGROUND

As information technologies evolve, various wireless communication technologies are providing users with convenient access to services and/or network connectivity. Many WLAN technologies are proposed by the Institute of Electrical and Electronics Engineers (IEEE) 802 standard organization. Groups related to the 802.11 family of standards are developing and commercializing standards that relate to quality of service (QoS) improvement, access point protocol, security enhancement, wireless management, etc.

Recently, 802.11a/g increased wireless speed to 54 Mbps with the introduction of Orthogonal Frequency Division Multiplexing (OFDM) technology. A link speed improvement came with 802.11n presenting users with single stream links up to 150 Mbps. Furthermore, 802.11ac brought with it the possibility of link speeds around 866 Mbps on a single spatial stream with wider channels (160 MHz) and higher modulation orders.

However, WLAN devices currently being deployed in diverse environments can provide frustratingly slow data traffic in some circumstances. For example, a dense scenario, such as trying to check email via a public Wi-Fi at a busy airport, can provide a negative user experience. A new IEEE 802.11ax WLAN standard is being developed that seeks to improve WLAN performance to better support a variety of applications such as video, cloud access, and offloading.

Thus, solutions for improving WLAN communication efficiency as well as for balancing load are desired to support environments such as wireless corporate offices, outdoor hotspots, and dense residential settings.

SUMMARY

The present disclosure describes example approaches that enable a station (STA) to choose a proper access point (AP) to associate with based on a (basic service set) BSS load element transmitted in a WLAN system. By including frequency and/or spatial stream underutilization fields on each 20 MHz channel and delta observable secondary channel utilization fields in a BSS load element, examples described herein can address one or both of overload issues and inefficient resource utilization challenges in at least some applications. In at least some examples, methods and systems for transmitting a BSS load element are provided to achieve overall network load balancing.

According to example aspects are methods and systems for generating and transmitting information about a basic service set (BSS) in a wireless local area network (WLAN) system, performed by an access point (AP). A BSS load element is generated by a AP that includes a capable (station) STA count field, a plurality of frequency and/or spatial stream underutilization fields, and a plurality of delta observable secondary channel utilization fields. The capable STA count field indicates a total number of STAs currently associated with the BSS. Each of the frequency and/or spatial stream underutilization fields indicates underutilized frequency and/or spatial stream domain resources on Orthogonal Frequency Division Multiple Access (OFDMA) resource units (RUs) for each channel, and each of the frequency and/or spatial stream underutilization fields is calculated based on RU size. Each of the delta observable secondary channel utilization fields indicates a utilization for a subband within a secondary channel calculated based on observable utilization on the corresponding secondary channel. The BSS load element is then transmitted in the WLAN.

In some examples, a station is provided for receiving the BSS element and selecting an AP to associate with based on the BSS elements received from one or more AP's. According to a further example aspect is a processing system configured to transmit information about a basic service set (BSS) in a wireless local area network (WLAN) system. The processing system includes: a processing device; a memory associated with the processing device; and a non-transient storage for storing instructions. The instructions, when loaded to the memory and executed by the processing device, cause the processing device to generate a BSS load element that includes a capable STA count field, underutilization information and observable secondary channel utilization information. The capable STA count field indicating a total number of STAs currently associated with the BSS. The underutilization information indicating information about underutilized frequency and/or spatial stream domain resources on Orthogonal Frequency Division Multiple Access (OFDMA) resource units (RUs) for each of a plurality of channels. The observable secondary channel utilization information including observable secondary channel utilization information for a plurality of subbands in one or more secondary channels. The instructions also cause the processing device to transmit the BSS load element.

BRIEF DESCRIPTION OF THE DRAWINGS

For a more complete understanding of the present invention, and the advantages thereof, reference is now made to the following description taken in conjunction with the accompanying drawings, in which:

FIG. 3A is a prior art extended BSS load element format in 802.11ac;

FIG. 3B is a spatial stream underutilization field equation of the extended BSS load element of FIG. 3A;

FIG. 4B illustrates RUs supported in 20, 40 and 80 MHZ channels of a 802.11ax environment;

FIG. 5B are frequency and spatial stream underutilization field equations of the BSS load element of FIG. 5A;

FIG. 5C is a frequency underutilization field equation of the BSS load element of FIG. 5A according to further example embodiments;

FIG. 5D is a spatial stream underutilization field equation of the BSS load element of FIG. 5A according to further example embodiments;

FIG. 5E are delta observable utilization field equations of the BSS load element of FIG. 5A;

FIG. 5F is a observable utilization field equation for use in the delta observable utilization equations of FIG. 5E;

Similar reference numerals may have been used in different figures to denote similar components.

DETAILED DESCRIPTION OF ILLUSTRATIVE EMBODIMENTS

In dense wireless environments, such as a wireless corporate office, an outdoor hotspot, or a crowded residential setting, an access point (AP) may become overloaded by traffic if the AP associates with too many stations (STAs). Accordingly, methods and systems for providing and transmitting a basic service set (BSS) load element in a WLAN system to improve spectral efficiency and link reliability are described below.

Figure 1:
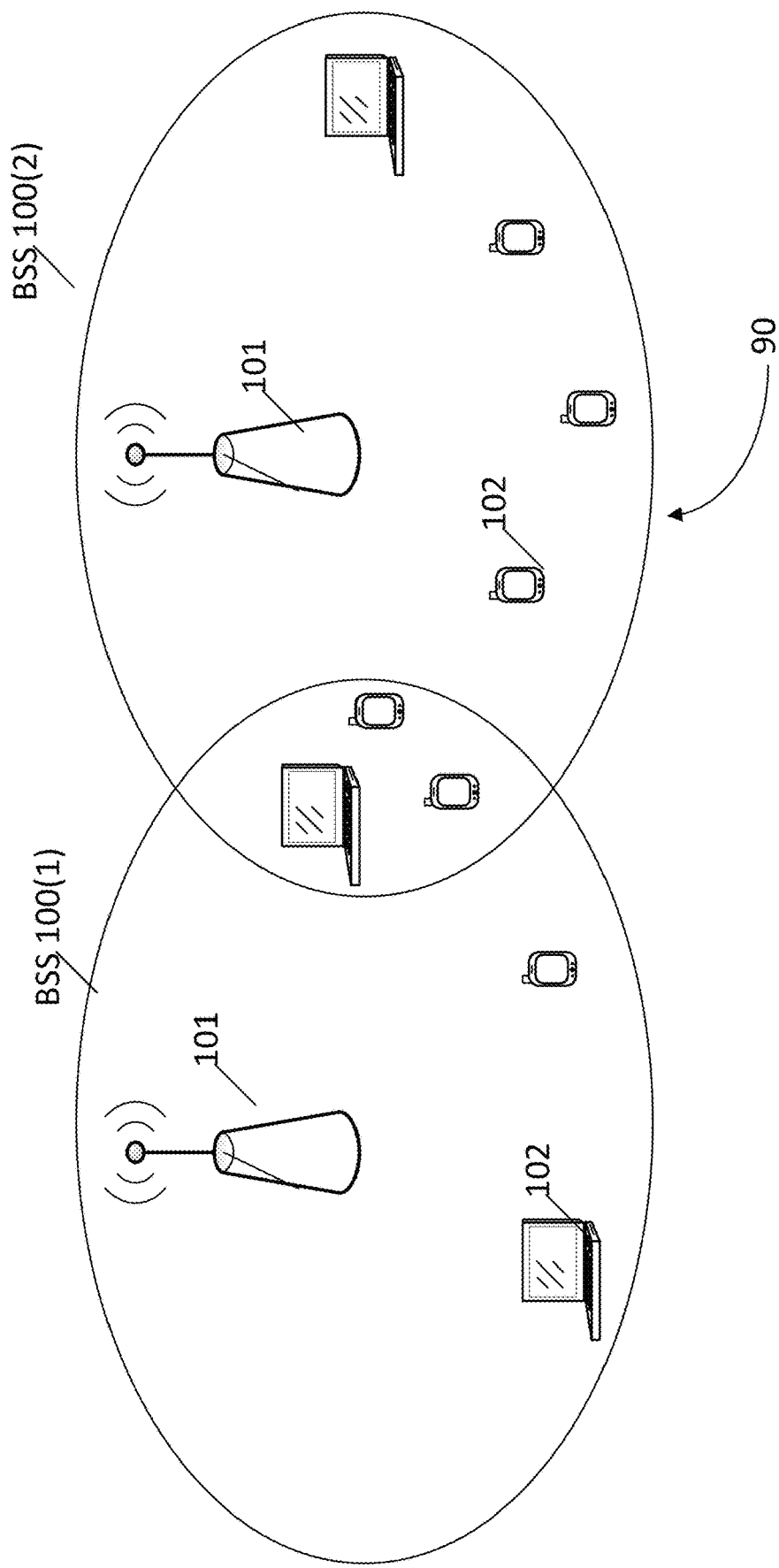
FIG. 1 is a schematic diagram illustrating a WLAN system for communications according to example embodiments.

FIG. 1 provides a schematic diagram of a WLAN system 90 in which methods described herein may be implemented. An AP 101 together with at least one associated STA 102 is called an infrastructure basic service set (BSS). FIG. 1 includes two representative BSSs 100(1), 100(2) (herein referred to generically as BSS 100) in WLAN system 90. AP 101 is any entity that has STA functionality and provides access to a distribution service for associated STAs 102. As used herein, STAs 102 may be mobile devices enabled for wireless communications, including but not limited to cell phones, smart phones, laptops, tablet computers, machine-type communication devices, Internet of Things (IoT) devices, and wireless sensing and reporting devices.

Figure 2:
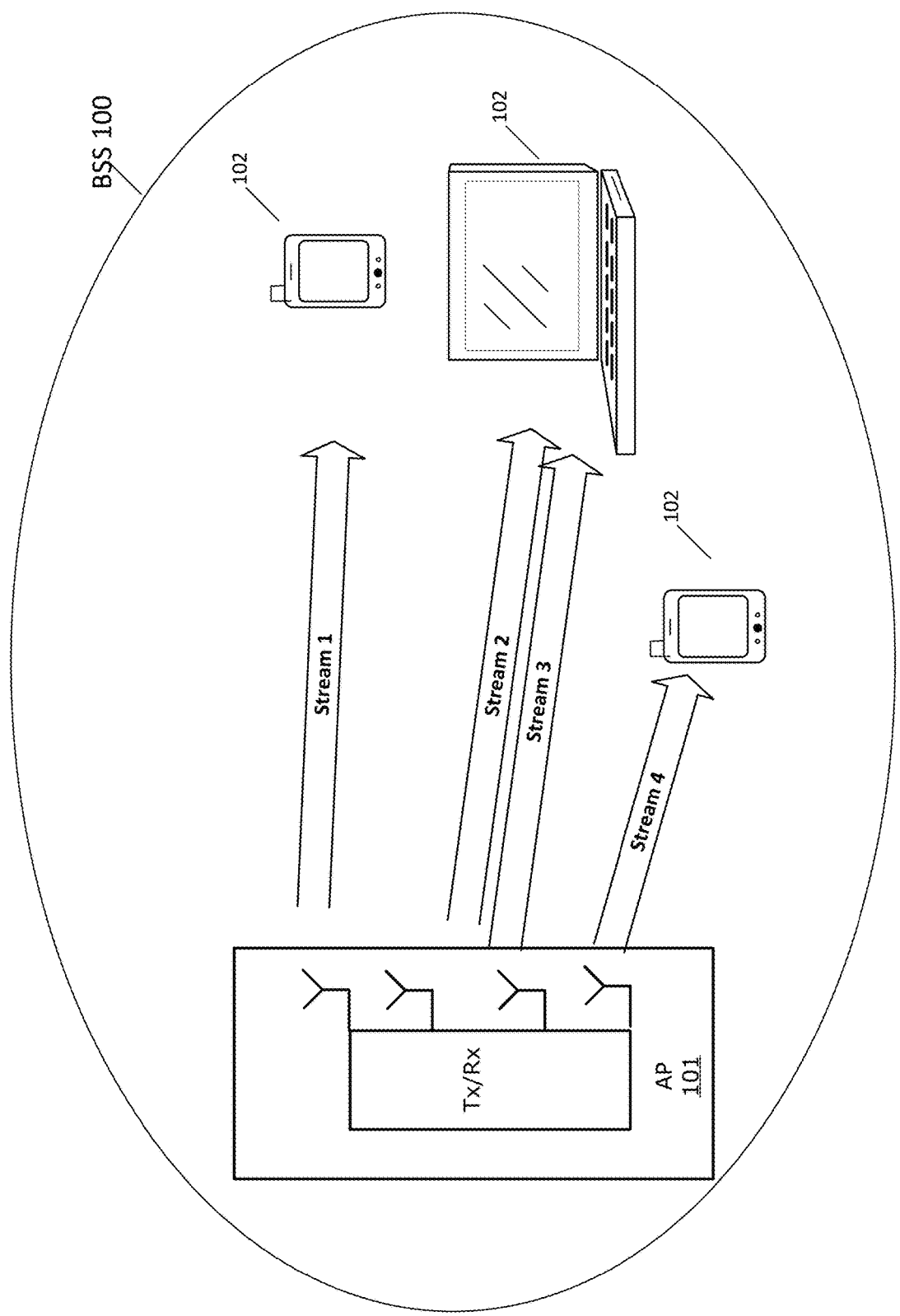
FIG. 2 is a schematic diagram of a MU-MIMO WLAN system for communications according to example embodiments.

Referring to FIG. 2, examples of a WLAN system 90 will be described in the context of wireless communications between a plurality of STAs 102 and an AP 101 of BSS loft Multi-user multiple input multiple output (MU-MIMO) based transmission using multiple AP antennas allows simultaneous channel access by the plurality of STAs 102 for effective use of a radio channel in a WLAN system. AP 101 can simultaneously transmit spatial-multiplexed data to the plurality of STAs 102. When data is simultaneously transmitted to the plurality of STAs 102 using a plurality of respective spatial streams (stream 1, 2, 3, 4), an overall throughput (TH) of the WLAN system 90 can be increased.

In the WLAN system 90, a STA 102 performs scanning, authentication, and association procedures with an AP 101 that provides a WLAN service. In conventional WLAN, when a plurality of APs are found as a result of AP scanning performed by a STA, the STA normally prefers to access the AP that provides the STA with the strongest received power. However, there will be a large number of STAs and traffic in dense environments. In the absence of effective load balancing, some APs may be associated with too many STAs and be over-loaded. If a STA chooses a busy or overloaded AP 101, the STA will have less opportunities for scheduled transmissions. Accordingly, in example embodiments, overall load balance of the WLAN system 90 is taken into account when a STA 102 selects an AP 101 in a dense environment.

In IEEE 802.11ac, the conventional extended BSS load element 300 is defined as shown in FIG. 3A. An MU-MIMO spatial stream underutilization field 301 is included in the extended BSS load element 300 of a beacon frame to support a MU-MIMO feature. STAs use the received extended BSS load element 300 of the beacon frame for an implementation-specific AP selection algorithm in order to select an AP to associate with. As noted in FIG. 3A, the extended BSS load element 300 includes a spatial stream underutilization field 301, an observable secondary 20 MHz utilization field 302, an observable secondary 40 MHz utilization field 303, and an observable secondary 80 MHz utilization field 304.

The value used for the spatial stream underutilization field 301 is determined using Equation (1) below: (also shown in FIG. 3B):

$$\text{The spatial stream underutilization} = \left\lfloor \frac{N_{max\_SS} \times T_{busy} - T_{utilized}}{N_{max\_SS} \times T_{busy}} \times 255 \right\rfloor \quad (1)$$

Where:
$T_{utilized}$ represents $\Sigma_{i=1}^{N} N_{ss,i} T_i$, where $T_i$ is the time interval, in units of microseconds, during which the primary 20 MHz channel is busy due to the transmission of one or more spatial streams by the AP to MU beamforming capable STAs; $N_{ss,i}$ is the number of spatial streams transmitted during the time interval $T_i$; and N is the number of busy events that occurred during the total measurement time which is less than or equal to dot11ChannelUtilizationBeaconIntervals consecutive beacon intervals.

$N_{max\_SS}$ is the maximum number of spatial streams supported by the AP.

$T_{busy}$ is the number of microseconds that a Clear Channel assessment (CCA) indicated the channel was busy during a measurement duration. The resolution of the CCA busy measurement is in microseconds.

IEEE 802.11ac supports Orthogonal Frequency Division Multiplexing (OFDM) with single user (SU)/MU-MIMO, and as a result frequency utilization is only calculated on a primary 20 MHz channel and secondary 20/40/80 MHz channels. Because the BSS load fields included in the 802.11ac extended BSS load element 300 only contain information on MIMO spatial steam utilization and bandwidth utilization for entire channels, frequency utilization information is omitted that could be used by STAs when selecting an optimal AP to associate with. Accordingly, example embodiments described below provide a BSS load element that provides enhanced utilization information.

Figure 4A:
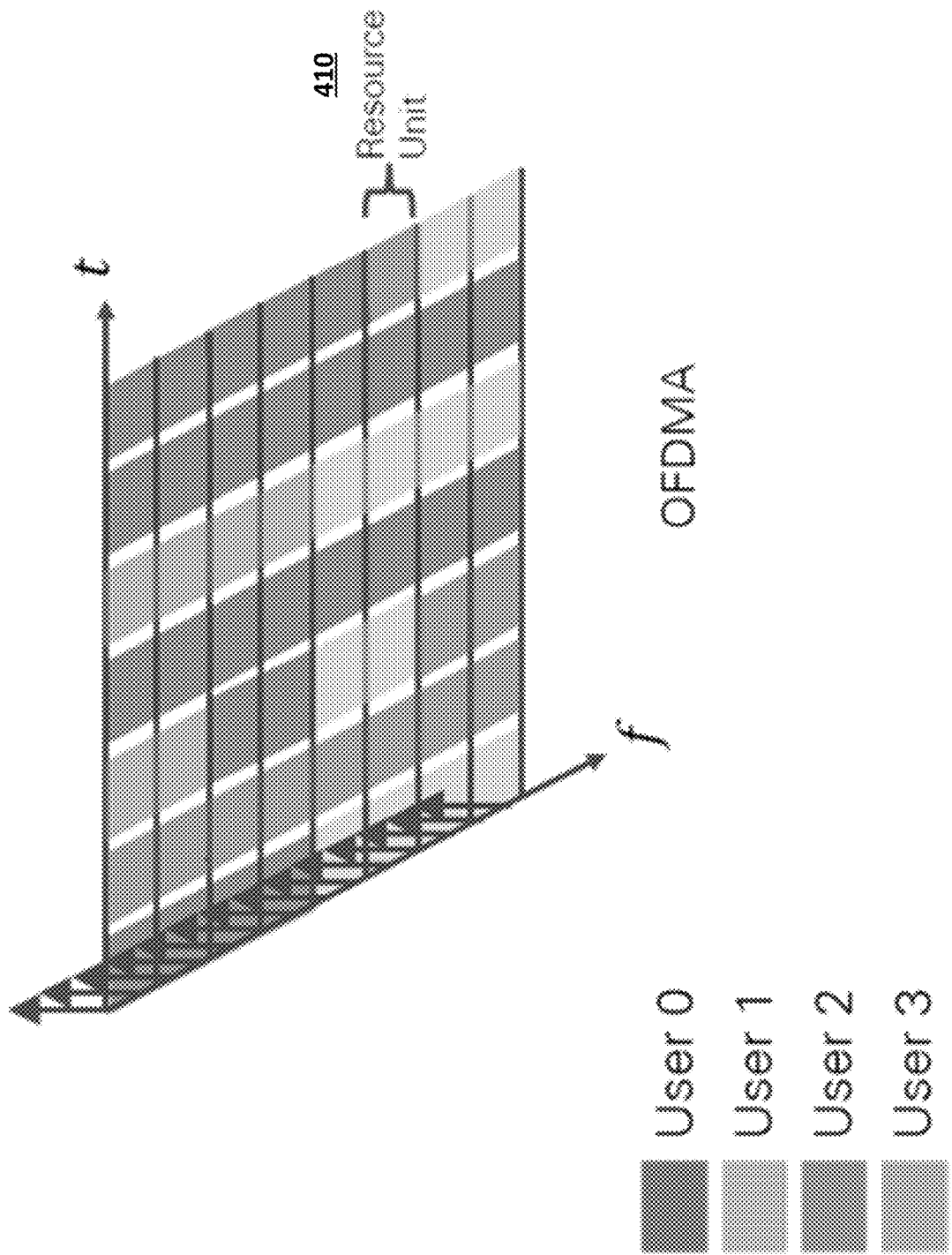
FIG. 4A illustrates OFDMA RUs in a frequency/time graph of an 802.11ax environment.

In IEEE 802.11ax, an Orthogonal Frequency Division Multiple Access (OFDMA) transmission scheme to multiplex more stations in the same channel bandwidth is defined, as illustrated in FIGS. 4A and 4B. In 802.11ax, specific sets of subcarriers are assigned to individual stations. Referring to FIG. 4, a channel (which can have a 20, 40, 80 or 160 MHz bandwidth) is divided into smaller sub-channels that each have a predefined number of subcarriers. The smallest sub-channel is called a resource unit (RU) 410. RU sub-channels can include: 26 tone RU, 52 tone RU, 106 tone RU, 242 tone RU, 484 tone RU, 996 tone RU and 2*996 tone RU.

As illustrated in FIG. 4B, the following tone size RUs are supported for the following bandwidth size channels: (1) 20 MHz bandwidth: 26 tone RU, 52 tone RU, 106 tone RU and 242 tone RU; (2) 40 MHz bandwidth: 26 tone RU, 52 tone RU, 106 tone RU, 242 tone RU and 484 tone RU; (3) 80 MHz bandwidth: 26 tone RU, 52 tone RU, 106 tone RU, 242 tone RU, 484 tone RU, and 996 tone RU; and (4) 160 MHz (or 80+80 MHz) bandwidth: 26 tone RU, 52 tone RU, 106 tone RU, 242 tone RU, 484 tone RU, 996 tone RU and 2*996 tone RU. OFDMA RU includes full bandwidth, that is the case of the maximum RU within the bandwidth.

Figure 4C:
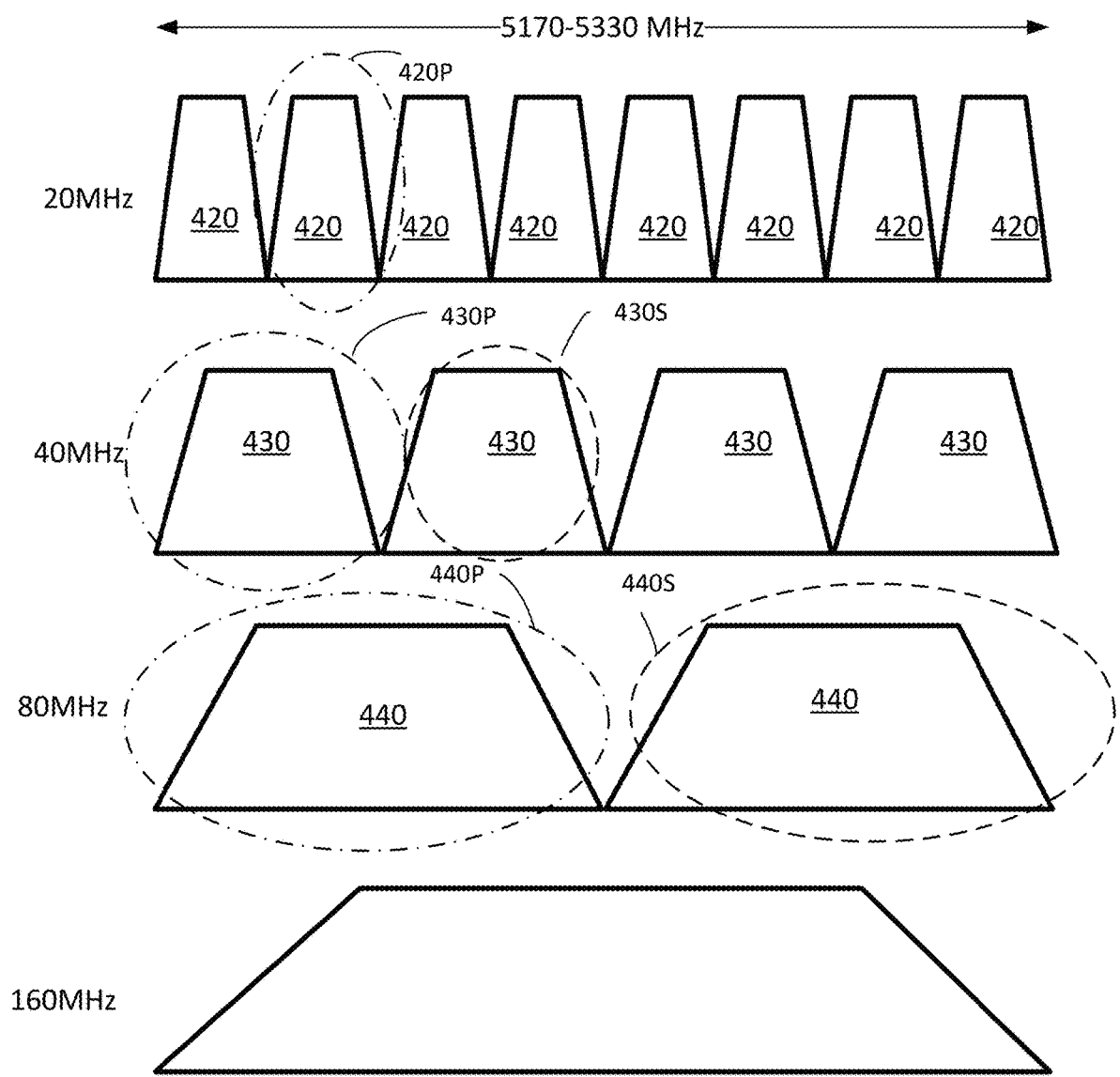
FIG. 4C illustrates an example of channel blocks within a frequency bandwidth in an 802.11ax environment.

FIG. 4C illustrates an example of an available bandwidth (5170-5330 MHz in the illustrated example) divided into channel bandwidth blocks in accordance with 802.11ax. As illustrated in FIG. 4C, the available bandwidth is divided into the following channel blocks: eight 20 MHz channels 420 ($1^{st}$ to $8^{th}$ 20 MHz channels); four 40 MHz channels 430 that each includes two (2) ($1^{st}$ and $2^{nd}$) 20 MHz subbands; two 80 MHz 440 channels that includes four (4) ($1^{st}$ to $4^{th}$) 20 MHz subbands; and a 160 MHz channel (80 MHz+80 MHz).

In example embodiments, a BSS is allocated a 20 MHz segment within a 40, 80, or 160 MHz wide channel as the primary 20 MHz channel for the BSS. This 20 MHz channel forms the core frequency segment that the BSS or AP operates on. The 40 MHz channel that includes the spectrum of the primary 20 Hz channel is designated as the primary 40 MHz channel, and the 80 MHz channel that includes the primary 40 MHz channel is designated as the primary 80 MHz channel. The 80 MHz channel that is not the primary 80 MHz channel is designated as the secondary 80 MHz channel, and the non-primary 40 MHz channel that falls within the spectrum of the primary 80 MHz channel is designated as the secondary 40 MHz channel. The hierarchal structure is illustrated in FIG. 4C, where dashed loop 420P indicates a designated primary 20 MHz channel, dashed loop 430P indicates the corresponding primary 40 MHz channel and dashed loop 440P indicates the corresponding primary 80 MHz channel. Furthermore, dashed loop 440S indicates the corresponding designated secondary 80 MHz channel, and dashed loop 430S indicates the corresponding designated secondary 40 MHz channel.

Figure 5A:
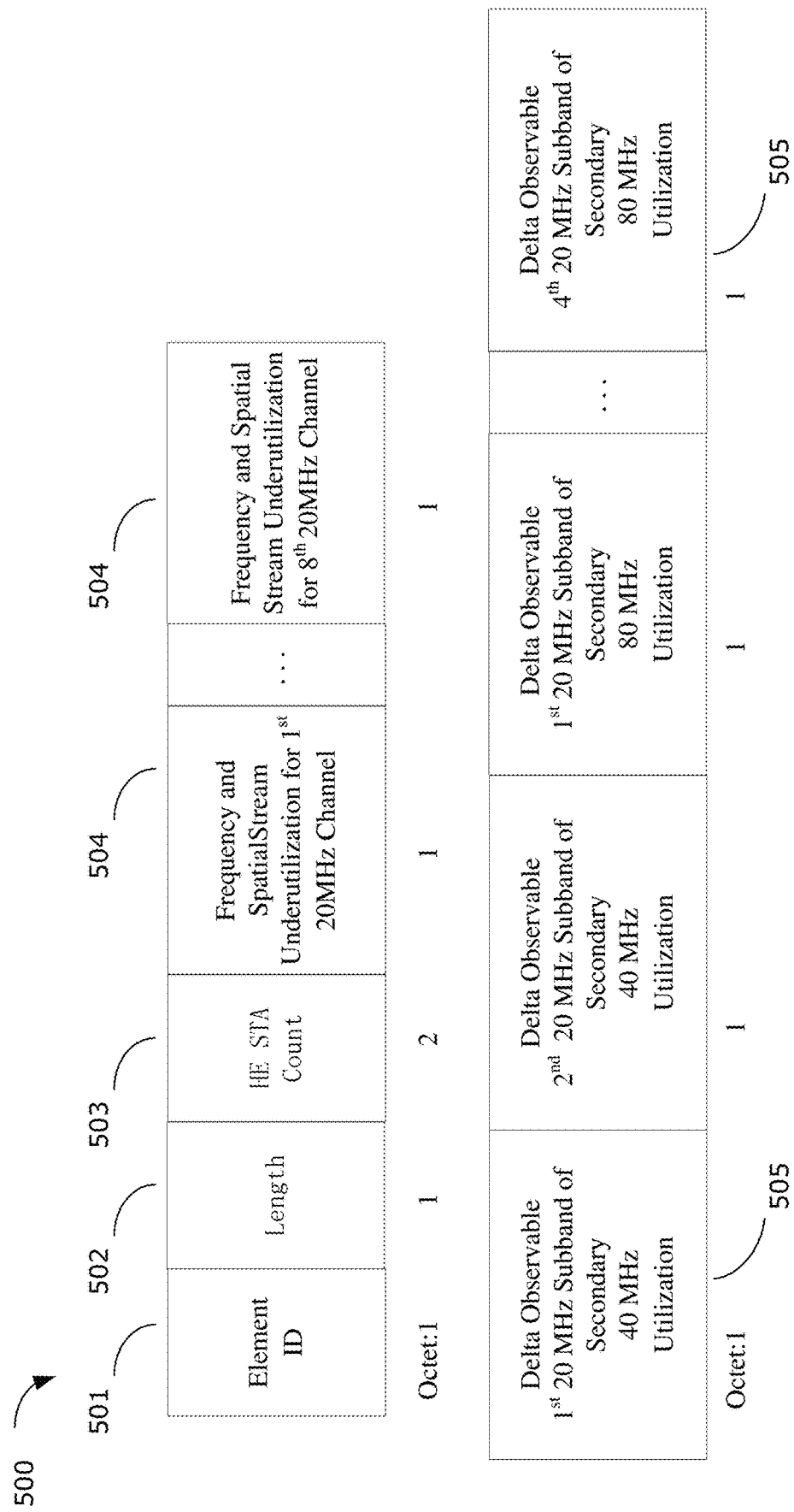
FIG. 5A is a BSS load element 500 format according to example embodiments.

A BSS load element 500 is defined as shown in FIG. 5A, in accordance with example embodiments. BSS load element 500 may be suitable for a High-Efficiency Wireless (HEW) 802.11ax environment, for example. The example BSS load element 500 shown in FIG. 5A is configured to include resource usage information for: up to eight (8) reserved 20 MHz channels 420 ($1^{st}$ to $8^{th}$ 20 MHZ channels), the two (2) ($1^{st}$ and $2^{nd}$) 20 MHz subbands of secondary 40 MHz channel 430S, and the four (4) ($1^{st}$ to $4^{th}$) 20 MHz subbands of secondary 80 MHz channel 440S.

The BSS load element 500 includes an element ID field 501, a length field 502, a HE STA count field 503, a plurality ($1^{st}$ to $8^{th}$) of frequency and spatial stream underutilization fields 504, and a plurality ($1^{st}$ to $6^{th}$) of delta observable secondary channel utilization fields 505. In the example of FIG. 5A, BSS load element 500 includes eight (8) frequency and spatial stream underutilization fields 504, one for each one of the $1^{st}$ to $8^{th}$ 20 MHz channels. BSS load element 500 includes six (6) delta observable secondary channel utilization fields 505, including fields 505 for each of the $1^{st}$ and $2^{nd}$ 20 MHz sub-bands of the secondary 40 MHz channel 430S, and fields 505 for each of the 1st to 4th 20 MHz sub-bands of the secondary 80 MHz channel 440S. As noted below, in some examples some of the 20 MHz channels 420 and secondary channels 430S, 440S may be reserved or unavailable to the BSS, in which case the corresponding fields in BSS load element 500 may include null information or be omitted. And some frequency and spatial stream underutilization fields may include null information or be omitted, depending on the bandwidth BSS load fields (501, 502, 503, $1^{st}$-$8^{th}$ 504, and $1^{st}$-$6^{th}$ 505) included in the BSS load element 500 are transmitted in data packets from AP 101 and provide useful information about the usage status of WLAN system 90. STAs 102 can use information from BSS load elements 500 to select an appropriate AP 101 to associate with for each 20 MHz channel. In particular, STAs 102 can use the WLAN usage status information in an implementation-specific AP selection algorithm, enabling each STA 102 to choose an appropriate AP 101 (for example an idle AP 101) to associate with. Optimized AP selection based on BSS load element 500 may in at least some examples increase the efficiency channels usage as well as decrease waiting time for scheduled transmissions.

In the illustrated example, as shown in FIG. 5A, the capable station (STA) count field 503 indicates the total number of STAs that are currently associated with the AP 101 and that are HE capable or MU-MIMO and OFDMA capable.

OFDMA/MU-MIMO capable STAs currently associated with the AP 101 transmitting the BSS load element 500.

The frequency and spatial stream underutilization field 504 for each 20 MHz channel is populated with a value that represents the percentage of time, linearly scaled with 255 representing 100%, that the AP 101 has underutilized frequency and spatial stream domain resources for given busy time of the medium on OFDMA RUs for the 20 MHz channel 420. Accordingly, the field 504 includes information about resource underutilization for the subject 20 MHz channel 420. The frequency and spatial stream underutilization value is calculated for each of the eight 20 MHz channels. In example embodiments, this percentage is calculated using either equation (2A), (2B), or equation (3) below for a measured 20 MHz channel 420 (also shown in FIG. 5B):

Frequency and Spatial Stream Underutilization= (2A)

$$\left[ \frac{\sum_{j=1}^{N_{1_{RU_1}}} RU1_j \times T_{busy} - \sum_{i=1}^{N} \left\{ \left( \sum_{j=1}^{N_{1_{RU_1}}} B_{j,i} \times RU1_j \right) \times T_i \right\}}{\sum_{j=1}^{N_{1_{RU_1}}} RU1_j \times T_{busy}} \times 255 \right] \times$$

$$\frac{\sum_{j=1}^{N_{1_{RU_1}}} RU1_j}{\sum_{j=1}^{N_{1_{RU_1}}} RU1_j + N_{maxSS} \times \sum_{j=1}^{N_{2_{RU_2}}} RU2_j} +$$

$$\left[ \frac{N_{maxSS} \times \sum_{j=1}^{N_{2_{RU_2}}} RU2_j \times T_{busy} - \sum_{i=1}^{N} \left\{ \left( \sum_{j=1}^{N_{2_{RU_2}}} N_{SS,j,i} \times RU2_j \right) \times T_i \right\}}{N_{maxSS} \times \sum_{j=1}^{N_{RU_2}} RU2_j \times T_{busy}} \times 255 \right] \times$$

$$\frac{N_{maxSS} \times \sum_{j=1}^{N_{2_{RU_2}}} RU2_j}{\sum_{j=1}^{N_{1_{RU_1}}} RU1_j + N_{maxSS} \times \sum_{j=1}^{N_{2_{RU_2}}} RU2_j}$$

Or in an alternative embodiment:

$$\left[ \frac{RU3_{max} \times T_{busy} - \sum_{i=1}^{N} \left\{ \left( \sum_{j=1}^{N_{1_{RU_3}}} B_{j,i} \times RU3_j \right) \times T_i \right\}}{RU3_{max} \times T_{busy}} \times 255 \right] \times \quad (2B)$$

$$\frac{RU3_{max}}{RU3_{max} + N_{maxSS} \times RU3_{max}} +$$

$$\left[ \frac{N_{maxSS} \times RU3_{max} \times T_{busy} - \sum_{i=1}^{N} \left\{ \left( \sum_{j=1}^{N_{2_{RU_2}}} N_{SS,j,i} \times RU2_j \right) \times T_i \right\}}{N_{maxSS} \times RU3_{max} \times T_{busy}} \times 255 \right] \times$$

$$\frac{N_{maxSS} \times RU3_{max}}{RU3_{max} + N_{maxSS} \times RU3_{max}}$$

Frequency and Spatial Stream Underutilization= (3)

$$\left[ \frac{\sum_{j=1}^{N_{1_{RU_1}}} RU1_j \times T_{busy} - \sum_{i=1}^{N} \left\{ \left( \sum_{j=1}^{N_{1_{RU_1}}} B_{j,i} \times RU1_j \right) \times T_i \right\}}{\sum_{j=1}^{N_{1_{RU_1}}} RU1_j \times T_{busy}} \times 255 \right] \times$$

$$a_i + \left[ \frac{N_{maxSS} \times \sum_{j=1}^{N_{2_{RU_2}}} RU2_j \times T_{busy} - \sum_{i=1}^{N} \left\{ \left( \sum_{j=1}^{N_{2_{RU_2}}} N_{SS,j,i} \times RU2_j \right) \times T_i \right\}}{N_{maxSS} \times \sum_{j=1}^{N_{RU_2}} RU2_j \times T_{busy}} \times 255 \right] \times a_j$$

Where:
$N_{max\_SS}$ is the maximum number of spatial streams supported by the AP.

$T_{busy}$ is the number of microseconds during which CCA indicated the channel was busy, or the measured 20 MHz channel was busy or occupied, during the measurement duration. The resolution of the CCA busy measurement is in microseconds.

$T_i$ is the time interval, in microseconds, during which the measured 20 MHz channel or primary 20 MHz channel is busy or is occupied due to an OFDMA transmission of one or more spatial streams between the AP and HE STAs;

$N_{RU}$ is the number of RUs which are allocated within the measured 20 MHz channel or the bandwidth or BSS bandwidth during time interval $T_i$;

$N_{SS,j,i}$ is the number of spatial streams transmitted over the j-th RU during time interval $T_i$;

N is the number of busy events that occurred during the total measurement time which is less than or equal to dot11ChannelUtilizationBeaconIntervals consecutive beacon intervals;

$RU1_j$ is a normalizing factor depending on the RU size. RU1 is applied in respect of RUs whose size is less than 106 tones. If the j-th RU1 is a 26-tone RU, then $RU1_j = 1/9$; If the j-th RU1 is a 52-tone RU, then $RU1_j = 2/9$;

$N1_{RU1}$ is the number of RUs whose size is less than 106 tones (RUs with normalization factor of less than 4/9) which are allocated within the measured 20 MHz channel or the bandwidth or BSS bandwidth during time interval $T_i$; If it is BSS bandwidth, any 20 MHz channels which are not occupied by a PPDU can be regarded one or more RUs when the bandwidth of PPDU is less than the BSS bandwidth, and these RUs are interpreted as interfered RUs;

$B_{j,i}$ is 1 if the j-th RU1 is occupied or interfered with in the busy time $T_i$, otherwise it is 0;

$RU2_j$ is a normalizing factor depending on the RU size. RU2 is applied in respect of RUs whose size is at least 106 tones. If the j-th RU is a 106-tone RU, then $RU_j = 4/9$; If the j-th RU is a 242-tone RU or lager, then $RU_j = 1$.

$N2_{RU2}$ is the number of RUs whose size is at least 106 tones or greater (RUs with normalization factor of at least 4/9) which are allocated within the measured 20 MHz channel or the bandwidth or the BSS bandwidth during time interval $T_i$ If it is BSS bandwidth, any 20 MHz channels which are not occupied by a PPDU can be regarded one or more RUs when the bandwidth of PPDU is less than the BSS bandwidth, and these RUs are interpreted as interfered RUs; and $N_{SS,j,i}$ ranges from 0 to 8, which is the number of streams over the j-th RU2 in the busy time $T_i$, $N_{SS,j,i}$ is set to 0 if j-th RU2 is occupied or interfered with in the busy time $T_i$.

In equation (3) shown above and in FIG. 5B, $\alpha_i$ and $\alpha_j$ are normalized factors, namely $$a_i = \frac{\sum_{j=1}^{N_{1_{RU_1}}} RU1_j}{\sum_{j=1}^{N_{1_{RU_1}}} RU1_j + \sum_{j=1}^{N_{2_{RU_2}}} RU2_j} \text{ and } a_j = \frac{\sum_{j=1}^{N_{2_{RU_2}}} RU2_j}{\sum_{j=1}^{N_{1_{RU_1}}} RU1_j + \sum_{j=1}^{N_{2_{RU_2}}} RU2_j}$$

(in some examples, other equations may be used to determine normalization factors $\alpha_i$ and $\alpha_j$).

In this example, the underutilization fields are calculated based on OFDMA and/or MU-MIMO transmission, hence N is used to indicate the number of MU PPDU transmission events, including OFDMA PPDU, OFMDA+MU-MIMO PPDU and full bandwidth MU-MIMO PPDU.

As noted in the above equations, in example embodiments, the frequency and spatial stream underutilization field 504 includes elements that are calculated both for RUs that have a size less than 106 tones and RUs that have a size that is 106 tones or greater. Referring to FIG. 5B, in equations (2) and (3), each frequency and spatial stream underutilization fields is calculated based on $RU1_j$ (indicated by dotted circle 510) and $RU2_j$ (indicated by dotted circle 520). As noted above, $RU1_j$ is a normalizing factor that depends on the RU size. RU1 is applied in respect of RUs whose size is less than 106 tones. When the j-th RU1 is a 26-tone RU, then $RU1_j=1/9$; when the j-th RU1 is a 52-tone RU, then $RU1_j=2/9$. Moreover, $RU2_j$ is also a normalizing factor that depends on the RU size. RU2 is applied in respect of RUs whose size is at least 106 tones or greater. When the j-th RU is a 106-tone RU, then $RU_j=4/9$; when the j-th RU is a 242-tone RU or larger, then $RU_j=1$. Accordingly, the frequency and spatial stream underutilization fields 504 incorporate information that is based on the size of the RUs included in the BSS. Based on this information, STAs can select a proper AP to associate with that may increase resource utilization with WLAN system 90 and decrease waiting time for scheduled transmissions.

As will be appreciated from equations (2) and (3), the channel resource underutilization information that is included for each of the 20 MHz channels 420 in BSS element 500 is determined based on RU resource usage, rather than just channel wide usage as was previously done in the BSS element 300 of 802.11ac.

In the illustrated embodiment, when $T_{busy}$ is 0, the frequency and spatial stream underutilization field 504 is reserved. In an alternative example embodiment, $T_{busy}$ may be not the number of microseconds during which an CCA indicated the measured 20 MHz channel was busy during the measurement duration for uplink multiple user (MU) transmission. Instead, $T_{busy}$ could be the number of microseconds during which there is at least one received transmission over one RU within the measured 20 MHz channel during the measurement duration for uplink MU transmission. Alternatively, $T_{busy}$ may be any other suitable measure of how busy the channel is.

In alternative example embodiments, the average frequency and spatial stream underutilization field over the whole bandwidth of all available 20 MHz channels is provided by AP 101. This can be calculated by averaging all the frequency and spatial stream underutilizations per 20 MHz channel within the bandwidth. Alternatively, equations (2) or (3) can be adapted to cover the entire available bandwidth, with normalizing factor $RU1_j$ and $RU2_j$ calculated as RU size divided by the maximum RU within the bandwidth or BSS bandwidth, e.g., when RU1 is a 26 tone RU in 40 MHz bandwidth, then $RU1_j=26/484 \approx 1/18$.

Referring to FIG. 5A, as noted above, the plurality of frequency and spatial stream underutilization fields 504 include a respective field 504 for each of the eight (8) channels 420, from the first 20 MHz channel to the 8th 20 MHz channel. The first 20 MHz channel to the 8th 20 MHz channel correspond to the 20 MHz sub-channel with the lowest frequency to the 20 MHz sub-channel with the highest frequency, respectively.

In alternative example embodiments, frequency and spatial stream underutilization can be divided into two parts.

The frequency underutilization is defined by the following equation (4A), which is also shown in FIG. 5C, or alternatively by equation (4B) or equation (4C) (all collectively referred to herein as equation (4)):

$$\text{Frequency underutilization} = \left[ \frac{\left| \sum_{j=1}^{N1_{RU1}} RU1_j \times T_{busy} - \sum_{i=1}^{N} \left\{ \left( \sum_{j=1}^{N1_{RU1}} B_{j,i} \times RU1_j \right) \times T_i \right\} \right|}{\sum_{j=1}^{N1_{RU1}} RU1_j \times T_{busy}} \times 255 \right] \quad (4A)$$

or $$\text{Frequency underutilization} = \left[ \frac{\left| \sum_{j=1}^{N1_{RU1}} RU1_j \times T_{busy} - \sum_{i=1}^{N} \left\{ \left( \sum_{j=1}^{N1_{RU1}} B_{j,i} \times RU3_j \right) \times T_i \right\} \right|}{\sum_{j=1}^{N1_{RU1}} RU1_j \times T_{busy}} \times 255 \right] \quad (4B)$$

$$\left[ \frac{\left| \sum_{j=1}^{N1_{RU3}} RU1_j \times T_{busy} - \sum_{i=1}^{N} \left\{ \left( \sum_{j=1}^{N1_{RU3}} B_{j,i} \times RU3_j \right) \times T_i \right\} \right|}{\sum_{j=1}^{N1_{RU3}} RU3_j \times T_{busy}} \times 255 \right] \quad (4B)$$

or $$\left[ \frac{\left| RU3_{max} \times T_{busy} - \sum_{i=1}^{N} \left\{ \left( \sum_{j=1}^{N1_{RU3}} B_{j,i} \times RU3_j \right) \times T_i \right\} \right|}{RU3_{max} \times T_{busy}} \times 255 \right] \quad (4C)$$

Where RU3 includes both RU1 and RU2, and $RU3_{max}$ is a normalizing factor of the maximum RUs within the BSS bandwidth, and is set to 1, in this case, $N1_{RU1}$, $N1_{RU3}$ and $N2_{RU2}$ are the numbers of the RU within BSS bandwidth. In another embodiment, $RU3_{max}$ is a normalizing factor of the maximum RUs within the HE PPDU bandwidth. For example, in the 40 MHz BSS bandwidth, the maximum RU size of 40 MHz BSS bandwidth is 484 tones, the maximum RU within the 20 MHz bandwidth of the MU PPDU is 242 tones, hence $RU3_{max}=242/484=0.5$, in this case, $N1_{RU1}$, $N1_{RU3}$ and $N2_{RU2}$ are the numbers of the RU within bandwidth of PPDU. In the second embodiment, $RU3_{max}$ varies with $T_{busy,i}$, hence the exact expression is $$\left[ \frac{\left| \sum_{i=1}^{N3} RU3_{max,i} T_{busy,i} - \sum_{i=1}^{N} \left\{ \left( \sum_{j=1}^{N1_{RU3}} B_{j,i} \times RU3_j \right) \times T_i \right\} \right|}{\sum_{i=1}^{N3} RU3_{max,i} T_{busy,i}} \times 255 \right]$$

Where $T_{busy,i}$ is the time interval, in microseconds, during which the measured 20 MHz channel or primary 20 MHz channel is busy or is occupied due to an OFDMA transmission of one or more spatial streams between the AP and HE STAs, and $T_{busy,i}=T_i$, $N_3=N$.

$RU3_{max,i}$ is applied for the equation 5B, but $T_{busy,i}$ is the time interval, in microseconds, during which the measured 20 MHz channel or primary 20 MHz channel is busy or is occupied due to an OFDMA transmission of one or more spatial streams (in an OFDMA or OFDMA plus MU-MIMO embodiment) and/or a transmission of one or more spatial streams (in a MU-MIMO embodiment) between the AP and HE STAs $\sum_{j=1}^{N1_{RU}3} RU3_j$ is approximately equal to $RU3_{max}$, but they are not exactly the same because there are some additional leftover tones in the RU related to $RU3_{max}$ compared with the sum of those RUs related to $\sum_{j=1}^{N1_{RU}3} RU3_j$. In addition, $\sum_{j=1}^{N1_{RU}3} RU3_j$ varies with event N The spatial stream underutilization is defined by the following equations (5A) or (5B), which is also shown in FIG. 5D:

Spatial Stream Underutilization= (5A)

$$\left| \frac{N_{maxSS} \times \sum_{j=1}^{N2_{RU}2} RU2_j \times T_{busy} - \sum_{i=1}^{N} \left\{ \left( \sum_{j=1}^{N2_{RU}2} N_{SS,j,i} \times RU2_j \right) \times T_i \right\}}{N_{maxSS} \times \sum_{j=1}^{N_{RU}2} RU2_j \times T_{busy}} \times 255 \right|$$

Alternatively:

Spatial Stream Underutilization= (5B)

$$\left| \frac{N_{maxSS} \times RU3_{max} \times T_{busy} - \sum_{i=1}^{N} \left\{ \left( \sum_{j=1}^{N2_{RU}2} N_{SS,j,i} \times RU2_j \right) \times T_i \right\}}{N_{maxSS} \times RU3_{max} \times T_{busy}} \times 255 \right|$$

Where RU3 includes both RU1 and RU2, and $RU3_{max}$ is a normalizing factor of the maximum RUs within the bandwidth The parameters included in equations (4) and (5) have the same values as indicated above in respect of equations (2) and (3). In equations (5A) and (5B), another meaning for $T_i$ is the time interval, in microseconds, during which the measured 20 MHz channel or primary 20 MHz channel is busy or is occupied due to an OFDMA transmission of one or more spatial streams (in an OFDMA or OFDMA plus MU-MIMO embodiment) and/or a transmission of one or more spatial streams (in a MU-MIMO embodiment) between the AP and HE STAs; In an example, the frequency underutilization and spatial stream underutilization can be calculated for each 20 MHz channel 420. In at least one example embodiment, the frequency and spatial stream underutilization field 504 in BSS load element 500 for each 20 MHz 420 channel can be substituted with either a frequency underutilization field or a spatial stream underutilization field or both a frequency underutilization field and a spatial stream underutilization field calculated according to equations (4) and (5). In equation (4), frequency underutilization is calculated based on RUs having less than 106 tones (equation 4A), or based on all RUs (equation 4B), however in equation (5) spatial stream underutilization is calculated based only on the RUs that are at least 106 tones or greater. Referring to FIGS. 5C and 5D, RU1j is indicated by dotted circle 510 in equation (4) and RU2j is indicated by dotted circle 520 in equation (5).

Referring to FIGS. 5E and 5F, the values used to populate the delta observable secondary channel utilization fields 505 of BSS load element 500 will be described in greater detail, according to example embodiments. In the BSS load element 500, transmission channels are divided into frequency utilizations for all 20 MHz channels 420 (compared, for example, to the 802.11ac BSS load element that only considers a primary 20 MHz channel and secondary 20/40/80 MHz channels). In example embodiments, a delta observable utilization is determined for each 20 MHz subband of the secondary 40 MHz and 80 MHz channels 430S and 440S based on a combination of the observable utilization of the specific 20 MHz subband and the observable utilization of the entire secondary 40 MHz or 80 MHz channel that the specific 20 MHz subband is part of.

As noted above, in an example embodiment, the BSS load element 500 includes delta observable secondary channel utilization fields 505 for six 20 MHz subbands, including two (2) subbands of the 40 MHz secondary channel 430S and four (4) subbands of the 80 MHz secondary channel 440S. Equations (6) and (7) below provide two alternative examples for determining the values used to populate the delta observable secondary channel utilization fields 505. In the following equations, "W2" is used to designate either the secondary 40 MHz band or 80 MHz band, with W2=40 MHz designating the secondary 40 MHz channel and W2=80 MHz designating the secondary 80 MHz channel. "W1" is used to designate a $W1^{th}$ subband within a W2 channel, with W1=1 or 2 for W2=40 MHz and W1=1, 2, 3 or 4 for W2=80 MHz.

Delta Observable $W1th$ 20 MHz (6)

subband of Secondary $W2$ Channel Utilization=

$$\left| \frac{T_{busy,w1,w2}}{dot11ChannelUtilizationBeaconIntervals \times dot11BeaconPeriod \times 1024} \times 255 \right| -$$

Observable Secondary $W2$ Channel Utilization

Alternative example equation:

Delta Observable $W1th$ 20 MHz (7)

subband of Secondary $W2$ Channel Utilization=

$$\left| \frac{T_{busy,w1,w2}}{dot11ChannelUtilizationBeaconIntervals \times dot11BeaconPeriod \times 1024} \times 255 \right| / \text{Observable}$$

Secondary $W2$ Channel Utilization

Where in the equation (6) and equation (7):
dot11ChannelUtilizationBeaconIntervals represents the number of consecutive beacon intervals during which the secondary channel busy time is measured.
$T_{busy,w1,w2}$ is computed as the sum of the durations from Physical Clear Channel Assessment(PHY-CCA).indication (BUSY,{per20 MHz bitmap}) (where the n-th (n=1, ..., 8) bit corresponding to the W1th 20 MHz channel of the secondary W2 is set 1) to the next occurrence of a PHY-CCA.indication primitive and that overlaps the measurement interval. By way of example, when W1=1, W2=40 MHz, then T_(busy,W1,W2) is T_(busy,1,40), and it is computed as the sum of the durations from PHY-CCA.indication (BUSY,{x1 ... X8}) where the xn bit is set to 1, and xn bit corresponds to the first 20 MHz channel of the secondary 40 MHz channel.

"Observable Secondary W2 utilization" is the observed utilization for the entire 40 Mhz secondary channel in the case of W2=40 MHz and the observed utilization for the entire 80 Mhz secondary channel in the case of W2=80 MHz.

It will be appreciated that equation (6) provides a delta observable value that is the difference between the observable utilization of the specific subband being measured and the observable utilization of the secondary 40 MHz or 80 MHz channel that the specific subband is part of, and equation (7) provides a delta observable value that is a ratio of the observable utilization of the specific subband being measured to the observable utilization of the secondary 40 MHz or 80 MHz channel that the specific subband is part of.

It will also be noted that the common initial portion of equations (6) and (7) provides an absolute observable value, which may alternatively or additionally be included as a field in the BSS load element 500, namely:

$$\text{Observable the } W1th \text{ 20 MHz of Secondary } W2 \text{ Utilization} = \left\lfloor \frac{T_{busy,w1,w2}}{dot11ChannelUtilizationBeaconIntervals \times dot11BeaconPeriod \times 1024} \times 255 \right\rfloor \quad (8)$$

Note that Observable the With 20 MHz of Secondary W2 Utilization can be used instead of Delta Observable With 20 MHz subband of Secondary W2 Channel Utilization in some examples.

BSS load element 500 also includes primary 20 MHz channel utilization, which can be computed through Equation 7 and 8 by using $T_{busy,primary\ 20\ Mhz}$ instead of $T_{busy,w1,w2}$.

In example embodiments, in addition to BSS load element 500, AP 101 will transmit a HT Operation element that includes a field that specifies supported STA channel widths, and/or a VHT Operation element that includes a field that specifies supported channel widths. If an AP 101 indicates a channel width of 20 MHz, 40 MHz, or 80 MHz in the STA channel width field of the HT Operation element and in the channel width field of the VHT Operation element, then the frequency and spatial stream underutilization for an $n^{th}$ (1≤n≤8) 20 MHz channel within secondary 80 MHz fields are reserved, and the observable or delta observable (from $1^{st}$ to $4^{th}$ 20 MHz) secondary 80 MHz utilization fields are reserved. If the AP indicates a channel width of 20 MHz or 40 MHz in the STA channel width field in the HT Operation element, then the frequency and spatial stream underutilization for an $n^{th}$ (1≤n≤8) 20 MHz channel within secondary 40 MHz fields are reserved and the observable or delta observable (from $1^{st}$ to $2^{nd}$ 20 MHz) secondary 40 MHz utilization fields are reserved. If the AP indicates a channel width of 20 MHz in the STA channel width field in the HT Operation element, then the frequency and spatial stream underutilization for an $n^{th}$ (1≤n≤8) 20 MHz channel corresponding to secondary 20 MHz field is reserved, or in some examples the frequency or spatial stream underutilization is reserved separately.

The underutilization for frequency and/or spatial stream of the equations (2), (3), (4), and (5), and the delta observable utilization of secondary channel of the equations (6) and (7) can be divided into two parts: one for uplink transmission and the other for downlink transmission. The corresponding parameters $T_i$, $T_{busy}$ and $T_{busy,w1,w2}$ are measured by uplink and downlink transmission separately. More specifically, the corresponding parameters $T_i$, $T_{busy}$ and $T_{busy,w1,w2}$ are measured by uplink and downlink MU transmission separately for uplink and downlink parts, where $T_{busy}$ and $T_{busy,w1,w2}$ are measured by accumulated uplink and downlink MU transmission time separately. In another embodiment, only the corresponding parameters $T_i$ and $T_{busy,w1,w2}$ are measured by uplink and downlink transmission separately for uplink and downlink parts. Primary 20 MHz channel utilization can also be divided into two parts: one for uplink transmission and the other for downlink transmission.

Figure 5G:
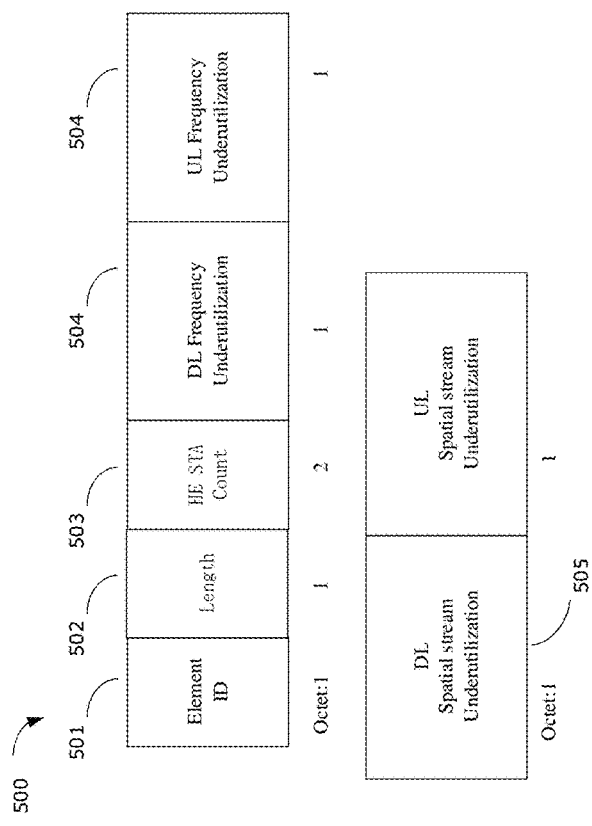
FIG. 5G is a BSS load element 500 format according to example embodiments.

FIG. 5G illustrates a BSS load element 500 format according to example embodiments in which the underutilization fields are calculated based on the whole bandwidth, and not per channel.

Figure 5H:
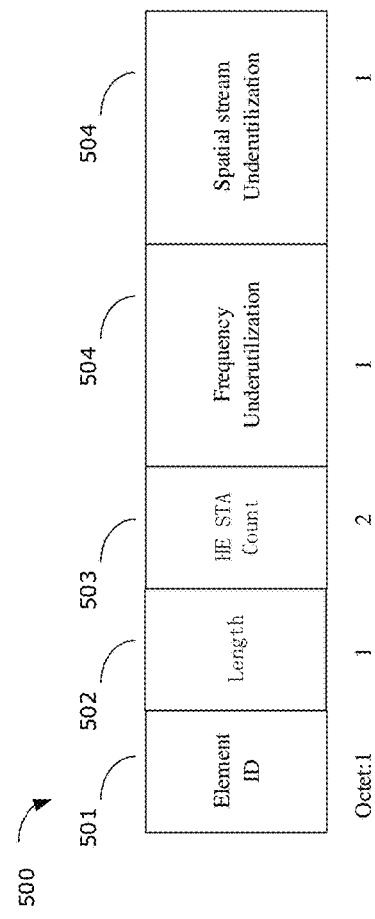
FIG. 5H is a BSS load element 500 format according to example embodiments.

FIG. 5H illustrates a BSS load element 500 format according to example embodiments in which the underutilization fields are calculated based on the whole bandwidth, and not per channel.

In alternative example embodiments, for the 26 tone RU in the central region of the 80 MHz channel bandwidth or at 80 MHz in the 160 MHz bandwidth (or 80+80 MHz bandwidth), the frequency underutilization is ignored for the 26 tone RU. In an alternative example, the central 26 tone RU is moved to a 20 MHz channel which is adjacent to the original location of the central 26 tone RU or to two 20 MHz channels which are adjacent to the original location of the central 26 tone RU. The normalizing factor for each RU in the equations (2), (3), (4) and (5) should be adjusted for the corresponding 20 MHz channel which contains the moved central 26 tone RU of the 80 MHz channel. For example, where $RU1_j$ is a normalizing factor for RUs whose size is less than 106 tones, when the j-th RU1 is a 26-tone RU, then $RU1_j=1/10$; when the j-th RU1 is a 52-tone RU, then $RU1_j=2/10$. Where $RU2_j$ is a normalizing factor for RUs whose size is at least 106 tones, when the j-th RU is a 106-tone RU, then $RU_j=4/10$; when the j-th RU is a 242-tone RU, then $RU_j=9/10$; and when the j-th RU is larger than a 242-tone RU, then $RU_j=1$.

In some example embodiments, the fields of BSS load element 500 that carry BSS load information (for example fields 504, 505) can also or alternatively be included in an extension of a legacy BSS load element, such as the 802.11ac extended BSS load element. A receiver (for example a STA 102) can use the length field or another explicit field, such as subelement ID, to know whether the legacy BSS load element carries the BSS load information for OFDMA/MU-MIMO transmission.

In alternative example embodiments, BSS load fields (for example fields 504, 505) included in the BSS load element 500 may be transmitted in Beacon or Probe responses. For example, the BSS load element 500 may be transmitted in a probe response in response to a probe request from a STA 102 for an AP 101 scan of the BSS. In an alternative example, the BSS load element 500 is transmitted in a beacon broadcasted periodically by the AP 101.

Figure 6:
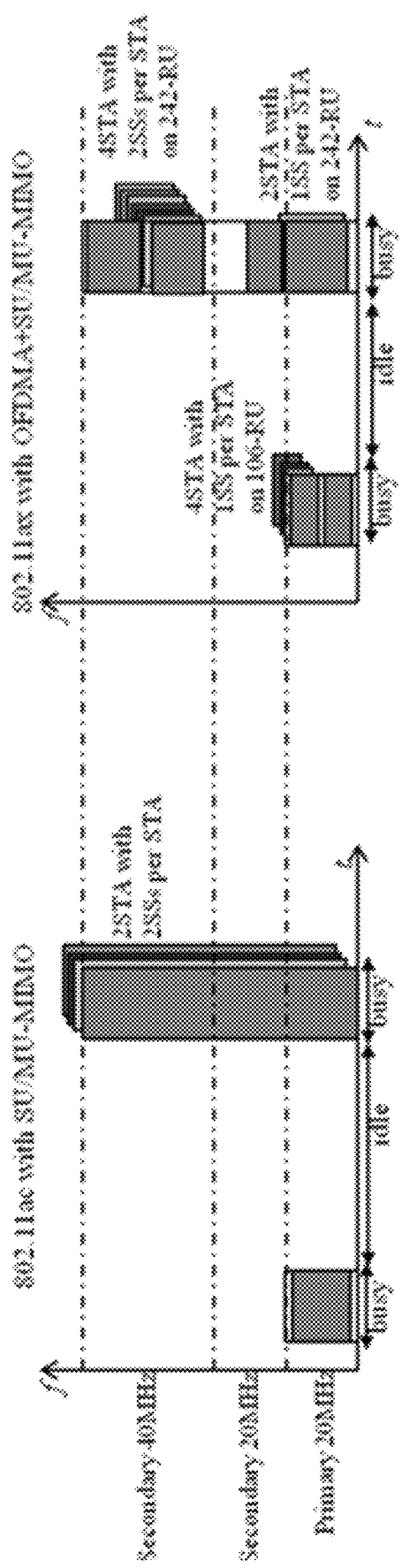
FIG. 6 shows an example of resource schedule of transmission for the BSS load element of FIG. 5A.

A comparison of resource utilization between 802.11ac and 802.11ax is shown in FIG. 6. FIG. 6 shows an example of the 802.11ax with downlink and uplink multi-user operation by means of MU-MIMO and OFDMA technology, which in some applications may increase the average throughput per user by 4 times in high-density scenarios, such as train stations, airports and stadiums.

Figure 7:
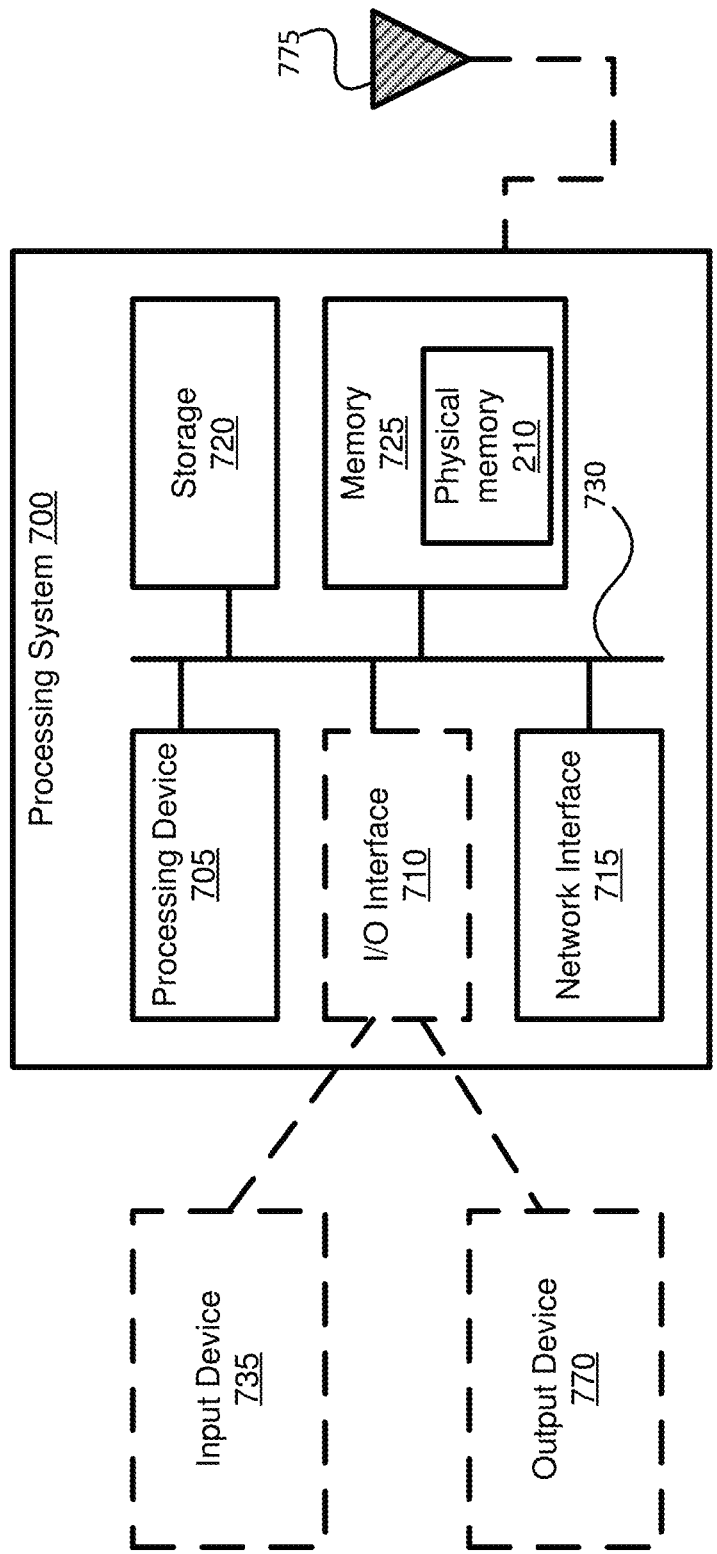
FIG. 7 is a schematic representation of a processing system used to implement the transmission of the BSS load element of FIG. 5A.

FIG. 7 is a schematic diagram of an example processing system 700, which may be used to implement the methods and systems disclosed herein, for example the AP 101 and one or more STAs 102. Other processing systems suitable for implementing examples described in the present disclosure may be used, which may include components different from those discussed below. Although FIG. 7 shows a single instance of each component, there may be multiple instances of each component in the processing system 700 and the processing system 700 could be implemented using parallel and/or distributed systems.

The processing system 700 may include one or more processing devices 705, such as a processor, a microprocessor, an application-specific integrated circuit (ASIC), a field-programmable gate array (FPGA), a dedicated logic circuitry, or combinations thereof. The processing system 700 may also include one or more optional input/output (I/O) interfaces 710, which may enable interfacing with one or more appropriate input devices 735 and/or output devices 770. The processing system 700 may include one or more network interfaces 715 for wired or wireless communication with a network (e.g., an intranet, the Internet, a P2P network, a WAN and/or a LAN, and/or a Radio Access Network (RAN)) or other node. The network interfaces 715 may include one or more interfaces to wired networks and wireless networks. Wired networks may make use of wired links (e.g., Ethernet cable). Wireless networks, where they are used, may make use of wireless connections transmitted over an antenna such as antenna 775. The network interfaces 715 may provide wireless communication via one or more transmitters or transmit antennas and one or more receivers or receive antennas, for example. In this example, a single antenna 775 is shown, which may serve as both transmitter and receiver. However, in other examples there may be separate antennas for transmitting and receiving, or antenna 775 may not be present. The processing system 700 may also include one or more storage units 720, which may include a mass storage unit such as a solid state drive, a hard disk drive, a magnetic disk drive and/or an optical disk drive.

The processing system 700 may include one or more memories 725 that can include physical memory 210, which may include a volatile or non-volatile memory (e.g., a flash memory, a random access memory (RAM), and/or a read-only memory (ROM)). The non-transitory memories 725 (as well as storage 720) may store instructions for execution by the processing devices 705, such as to carry out methods such as those described in the present disclosure. The memories 725 may include other software instructions, such as for implementing an operating system (OS), and other applications/functions. In some examples, one or more data sets and/or modules may be provided by an external memory (e.g., an external drive in wired or wireless communication with the processing system 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 730 providing communication among components of the processing system 700. The bus 730 may be any suitable bus architecture including, for example, a memory bus, a peripheral bus or a video bus. Optionally, input devices 735 (e.g., a keyboard, a mouse, a microphone, a touchscreen, and/or a keypad) and output devices 770 (e.g., a display, a speaker and/or a printer) are shown as external to the processing system 700, and connected to optional I/O interface 710. In other examples, one or more of the input devices 735 and/or the output devices 770 may be included as a component of the processing system 700.

The AP 101 and STAs 102 may each include multiple antennas 775 forming antenna arrays, and may carry out appropriate beamforming and beam steering controls (e.g., using beamsteering circuits and/or beamsteering control modules implemented by the processing device 705 and processing system 700), in order to carry out directional wireless communication, including transmitting BSS load elements 500 as illustrated in the above example embodiments of WLAN system 90.

Embodiments in which processing system 700(1) (herein referred to generically as processing system 700) is an AP may transmit BSS load elements 500 illustrated in the above example embodiments to a STA via the antenna 775 associated with the processing system 700(1). The processing device 705 may carry out the equations (2) to (7) in accordance with parameters stored in the storage 720 or memory 725.

Alternative example embodiments in which processing system 700(2) (herein referred to generically as processing system 700) is a STA, receiving the BSS load element illustrated in the above example embodiments from an AP via antenna 775 associated with the processing system 700(2). Then the processing device 705 may implement specific AP selection algorithm with the load fields included in the BSS load element, which may be stored in the storage 720 or memory 725.

Figure 8:
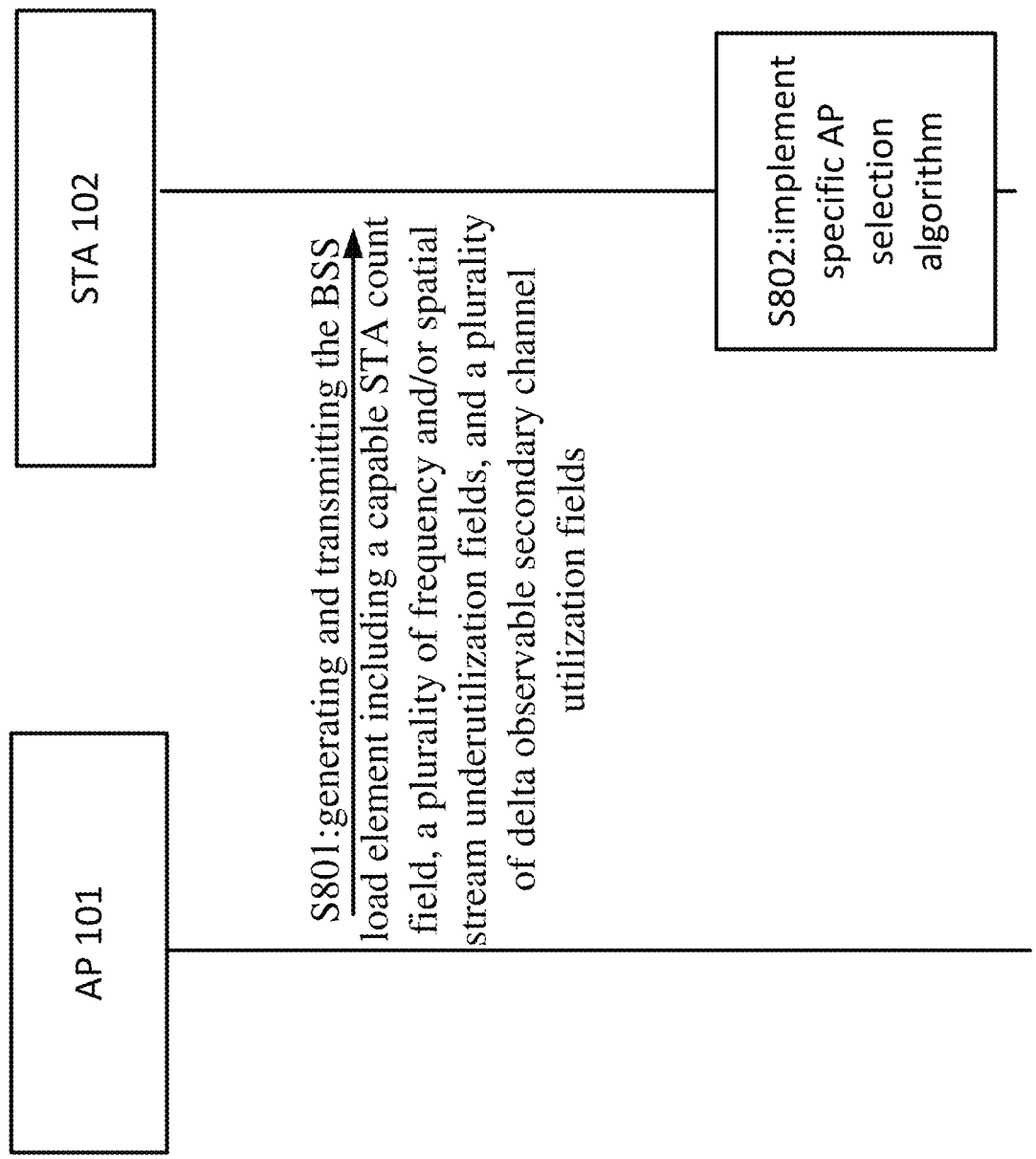
FIG. 8 is a block diagram of a method carried out on the processing system of FIG. 7 according to example embodiments.

FIG. 8 illustrates an example of a method implemented according to the above described embodiments for transmitting BSS load element from an AP on processing system 700(1) to a STA on another processing system 700(2). In at least some examples, instructions that cause the processing device 705 to carry out the method shown in FIG. 8 are stored in storage 720 of the processing system 700(1), such as an AP. The method includes generating at an AP and transmitting a BSS load element including HE capable STA count field, a plurality of frequency and/or spatial stream underutilization fields, and a plurality of delta observable secondary channel utilization fields (step 801), for a STA.

In example embodiments, instructions that cause the processing device 705 to carry out the method shown in FIG. 8 are stored in storage 720 of the processing system 700(2), such as a STA. The STA receives the BSS load element via the antenna 775 associated with the processing system 700(2). Then the processing system 700(2) of the STA implements a specific AP selection algorithm to select a proper AP to associate with (step 802).

In the present disclosure, methods for transmission of BSS load element with frequency and/or spatial stream underutilization information for each 20 MHz channel are described. Inclusion of a plurality of frequency and/or spatial stream underutilization fields on each 20 MHz channel and a plurality of delta observable secondary channel utilization fields in the BSS load element may more clearly and explicitly provide information regarding channel utilization of an AP, compared to the conventional approach. Using the examples disclosed herein, STAs can use the received BSS load element to choose a proper AP to be associated with to, which may increase the overall efficiency of the WLAN system as well as improve traffic flow and channel access.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
generating, by an access point (AP) in a wireless local area network (WLAN), a basic service set (BSS) load element, the BSS load element comprising:
a high-efficiency (HE) station (STA) count field,
a frequency underutilization field, and
a spatial stream underutilization field,
wherein the HE STA count field indicates a total number of one or more HE STAs currently associated with a BSS,
wherein the frequency underutilization field indicates underutilization of at least one frequency domain resource,
wherein the spatial stream underutilization field indicates underutilization of at least one spatial domain resource, and
wherein the frequency underutilization field is calculated based on a size of at least one orthogonal frequency-division multiple access (OFDMA) resource unit (RU), and the spatial stream underutilization field is calculated based on a size of at least one OFDMA RU; and
transmitting, by the AP, the BSS load element.

2. The method of claim 1, wherein the frequency underutilization field is defined as a percentage of time, linearly scaled with 255 representing 100%, the percentage of time is based on:

$$\text{frequency underutilization} = \left\lfloor \frac{RU_{max} \times T_{busy} - \sum_{i=1}^{N}\left\{\left(\sum_{j=1}^{N_{RU}} B_{j,i} \times RU_j\right) \times T_i\right\}}{RU_{max} \times T_{busy}} \times 255 \right\rfloor,$$

wherein $RU_{max}$ is a normalizing factor depending on a maximum RU size of a BSS bandwidth, and $RU_{max}$ is 1,
wherein $T_{busy}$ is a number of microseconds during which a clear channel assessment (CCA) indicates that a channel is busy during a measurement duration,
wherein $T_i$ is a time interval in microseconds during which a primary 20 MHz channel is busy,
wherein N is a number of busy events that occurred during a total measurement time, and the total measurement time is less than or equal to dot11ChannelUtilizationBeaconIntervals consecutive beacon intervals,
wherein $N_{RU}$ is a number of RUs allocated within the BSS bandwidth during $T_i$,
wherein $B_{j,i}$ is 1 if a j-th RU is occupied or interfered during $T_i$, and $B_{j,i}$ is 0 if the j-th RU is not occupied or interfered during $T_i$, and
wherein $RU_j$ is a normalizing factor depending on a RU size and equals a ratio of a j-th RU size to the maximum RU size of the BSS bandwidth.

3. The method of claim 1, wherein the spatial stream underutilization field is calculated based on one or more RUs having at least 106 tones.

4. The method of claim 3, wherein the spatial stream underutilization field is defined as a percentage of time, linearly scaled with 255 representing 100%, the percentage of time is based on:

$$\text{spatial stream underutilization} = \left\lfloor \frac{N_{maxSS} \times RU_{max} \times T_{busy} - \sum_{i=1}^{N}\left\{\left(\sum_{j=1}^{N_{RUM}} N_{SS,j,i} \times RUM_j\right) \times T_i\right\}}{N_{maxSS} \times RU_{max} \times T_{busy}} \times 255 \right\rfloor,$$

wherein $RU_{max}$ is a normalizing factor depending on a maximum RU size of a BSS bandwidth, and $RU_{max}$ is 1,
wherein $N_{max\_SS}$ is a maximum number of spatial streams supported by the AP,
wherein $N_{RUM}$ is a number of the one or more RUs whose sizes are at least 106 tones and which are allocated within the BSS bandwidth during $T_i$,
wherein $RUM_j$ is a normalizing factor depending on a size of a j-th RU having at least 106 tones, and $RUM_j$ equals a ratio of a j-th RU size to a maximum RUM size of the BSS bandwidth, and
wherein $N_{SS,j,i}$ is a number of one or more streams over a j-th RUM during $T_i$,
wherein $T_i$ is a time interval in microseconds during which a primary 20 MHz channel is busy, and
wherein $T_{busy}$ is a number of microseconds during which a CCA indicates that a channel is busy during a measurement duration.

5. The method of claim 1, the BSS load element further comprising:

a utilization field indicating utilization of a primary channel.

6. The method of claim 5, wherein the utilization field is calculated based on an interval of time during which the primary channel is busy.

7. The method of claim 5, wherein the utilization field representing a percentage number of the utilization of the primary channel, the percentage number is based on:

$$\left\lfloor \frac{T_{busy}}{dot11ChannelUtilizationBeaconIntervals \times dot11BeaconPeriod \times 1024} \times 255 \right\rfloor,$$

wherein $T_{busy}$ is a number of microseconds during which a clear channel assessment (CCA) indicates that the primary channel is busy during a measurement duration, wherein dot11ChannelUtilizationBeaconInterval represents a number of consecutive beacon intervals during which busy time of the primary channel is measured, and wherein dot11BeaconPeriod is a beacon period.

8. The method of claim 1, wherein the transmitting comprises:
transmitting the BSS load element in a beacon broadcasted or a probe response by the AP.

9. A processing system comprising:
at least one processor; and
a non-transitory computer readable storage medium storing instructions for execution by the at least one processor, the instructions, when executed by the at least one processor, cause the processing system to perform operations of:
generating a basic service set (BSS) load element, the BSS load element comprising:
a high-efficiency (HE) station (STA) count field,
a frequency underutilization field, and
a spatial stream underutilization field,
wherein the HE STA count field indicates a total number of one or more HE STAs currently associated with a BSS,
wherein the frequency underutilization field indicates underutilization of at least one frequency domain resource,
wherein the spatial stream underutilization field indicates underutilization of at least one spatial domain resource, and
wherein the frequency underutilization field is calculated based on a size of at least one orthogonal frequency-division multiple access (OFDMA) resource unit (RU), and the spatial stream underutilization field is calculated based on a size of at least one OFDMA RU; and
transmitting the BSS load element.

10. The processing system of claim 9, wherein the frequency underutilization field is defined as a percentage of time, linearly scaled with 255 representing 100%, the percentage of time is based on:

frequency underutilization=

$$\left\lfloor \frac{RU_{max} \times T_{busy} - \sum_{i=1}^{N}\left\{\left(\sum_{j=1}^{N_{RU}} B_{j,i} \times RU_j\right) \times T_i\right\}}{RU_{max} \times T_{busy}} \times 255 \right\rfloor,$$

wherein $RU_{max}$ is a normalizing factor depending on a maximum RU size of a BSS bandwidth, and $RU_{max}$ is 1, wherein $T_{busy}$ is a number of microseconds during which a clear channel assessment (CCA) indicates that a channel is busy during a measurement duration, wherein $T_i$ is a time interval in microseconds during which a primary 20 MHz channel is busy, wherein N is a number of busy events that occurred during a total measurement time, and the total measurement time is less than or equal to dot11ChannelUtilizationBeaconIntervals consecutive beacon intervals, wherein $N_{RU}$ is a number of RUs allocated within the BSS bandwidth during $T_i$, wherein $B_{j,i}$ is 1 if a j-th RU is occupied or interfered during $T_i$, and $B_{j,i}$ is 0 if the j-th RU is not occupied or interfered during $T_i$, and wherein $RU_j$ is a normalizing factor depending on a RU size and equals a ratio of a j-th RU size to the maximum RU size of the BSS bandwidth.

11. The processing system of claim 9, wherein the spatial stream underutilization field is calculated based on one or more RUs having at least 106 tones.

12. The processing system of claim 11, wherein the spatial stream underutilization field is defined as a percentage of time, linearly scaled with 255 representing 100%, the percentage of time is based on:

spatial stream underutilization=

$$\left\lfloor \frac{N_{maxSS} \times RU_{max} \times T_{busy} - \sum_{i=1}^{N}\left\{\left(\sum_{j=1}^{N_{RUM}} N_{SS,j,i} \times RUM_j\right) \times T_i\right\}}{N_{maxSS} \times RU_{max} \times T_{busy}} \times 255 \right\rfloor,$$

wherein $RU_{max}$ is a normalizing factor depending on a maximum RU size of a BSS bandwidth, and $RU_{max}$ is 1, wherein $N_{max\_SS}$ is a maximum number of spatial streams supported by the processing system, wherein $N_{RUM}$ is a number of the one or more RUs whose sizes are at least 106 tones and which are allocated within the BSS bandwidth during $T_i$, wherein $RUM_j$ is a normalizing factor depending on a size of a j-th RU having at least 106 tones, and $RUM_j$ equals a ratio of a j-th RU size to a maximum RUM size of the BSS bandwidth, and wherein $N_{SS,j,i}$ is a number of one or more streams over a j-th RUM during $T_i$, wherein $T_i$ is a time interval in microseconds during which a primary 20 MHz channel is busy, and wherein $T_{busy}$ is a number of microseconds during which a CCA indicates that a channel is busy during a measurement duration.

13. The processing system of claim 9, the BSS load element further comprising:
a utilization field indicating utilization of a primary channel, wherein the utilization field is calculated based on an interval of time during which the primary channel is busy.

14. The processing system of claim 13, wherein the utilization field representing a percentage number of the utilization of the primary channel, the percentage number is based on:

$$\left\lfloor \frac{T_{busy}}{dot11ChannelUtilizationBeaconIntervals \times dot11BeaconPeriod \times 1024} \times 255 \right\rfloor,$$

wherein $T_{busy}$ is a number of microseconds during which a clear channel assessment (CCA) indicates that the primary channel is busy during a measurement duration, wherein dot11ChannelUtilizationBeaconInterval represents a number of consecutive beacon intervals during which busy time of the primary channel is measured, and wherein dot11BeaconPeriod is a beacon period.

15. A processing system comprising:
at least one processor; and
a non-transitory computer readable storage medium storing instructions for execution by the at least one processor, the instructions, when executed by the at least one processor, cause the processing system to perform operations of:
  receiving a basic service set (BSS) load element, the BSS load element comprising:
    a high-efficiency (HE) station (STA) count field,
    a frequency underutilization field, and
    a spatial stream underutilization field,
    wherein the HE STA count field indicates a total number of one or more HE STAs currently associated with a BSS,
    wherein the frequency underutilization field indicates underutilization of at least one frequency domain resource,
    wherein the spatial stream underutilization field indicates underutilization of at least one spatial domain resource, and
    wherein the frequency underutilization field is calculated based on a size of at least one orthogonal frequency-division multiple access (OFDMA) resource unit (RU), and the spatial stream underutilization field is calculated based on a size of at least one OFDMA RU; and
  selecting an access point (AP) to associate with based on the BSS load element.

16. The processing system of claim 15, wherein the frequency underutilization field is defined as a percentage of time, linearly scaled with 255 representing 100%, the percentage of time is based on:

frequency underutilization=

$$\left\lfloor \frac{RU_{max} \times T_{busy} - \sum_{i=1}^{N}\left\{\left(\sum_{j=1}^{N_{RU}} B_{j,i} \times RU_j\right) \times T_i\right\}}{RU_{max} \times T_{busy}} \times 255 \right\rfloor,$$

wherein $RU_{max}$ is a normalizing factor depending on a maximum RU size of a BSS bandwidth, and $RU_{max}$ is 1, wherein $T_{busy}$ is a number of microseconds during which a clear channel assessment (CCA) indicates that a channel is busy during a measurement duration, wherein $T_i$ is a time interval in microseconds during which a primary 20 MHz channel is busy, wherein N is a number of busy events that occurred during a total measurement time, and the total measurement time is less than or equal to dot11ChannelUtilizationBeaconIntervals consecutive beacon intervals, wherein $N_{RU}$ is a number of RUs allocated within the BSS bandwidth during $T_i$, wherein $B_{j,i}$ is 1 if a j-th RU is occupied or interfered during $T_i$, and $B_{j,i}$ is 0 if the j-th RU is not occupied or interfered during $T_i$, and wherein $RU_j$ is a normalizing factor depending on a RU size and equals a ratio of a j-th RU size to the maximum RU size of the BSS bandwidth.

17. The processing system of claim 15, wherein the spatial stream underutilization field is calculated based on one or more RUs having at least 106 tones.

18. The processing system of claim 17, wherein the spatial stream underutilization field is defined as a percentage of time, linearly scaled with 255 representing 100%, the percentage of time is based on:

spatial stream underutilization=

$$\left\lfloor \frac{N_{maxSS} \times RU_{max} \times T_{busy} - \sum_{i=1}^{N}\left\{\left(\sum_{j=1}^{N_{RUM}} N_{SS,j,i} \times RUM_j\right) \times T_i\right\}}{N_{maxSS} \times RU_{max} \times T_{busy}} \times 255 \right\rfloor,$$

wherein $RU_{max}$ is a normalizing factor depending on a maximum RU size of a BSS bandwidth, and $RU_{max}$ is 1, wherein $N_{max\_SS}$ is a maximum number of spatial streams supported by the AP, wherein $N_{RUM}$ is a number of the one or more RUs whose sizes are at least 106 tones and which are allocated within the BSS bandwidth during $T_i$, wherein $RUM_j$ is a normalizing factor depending on a size of a j-th RU having at least 106 tones, and $RUM_j$ equals a ratio of a j-th RU size to a maximum RUM size of the BSS bandwidth, and wherein $N_{SS,j,i}$ is a number of one or more streams over a j-th RUM during $T_i$, wherein $T_i$ is a time interval in microseconds during which a primary 20 MHz channel is busy, and wherein $T_{busy}$ is a number of microseconds during which a CCA indicates that a channel is busy during a measurement duration.

19. The processing system of claim 15, the BSS load element further comprising:
a utilization field indicating utilization of a primary channel, wherein the utilization field is calculated based on an interval of time during which the primary channel is busy.

20. The processing system of claim 19, wherein the utilization field representing a percentage number of the utilization of the primary channel, the percentage number is based on:

$$\left\lfloor \frac{T_{busy}}{dot11ChannelUtilizationBeaconIntervals \times dot11BeaconPeriod \times 1024} \times 255 \right\rfloor,$$

wherein $T_{busy}$ is a number of microseconds during which a clear channel assessment (CCA) indicates that the primary channel is busy during a measurement duration, wherein dot11ChannelUtilizationBeaconInterval represents a number of consecutive beacon intervals during which busy time of the primary channel is measured, and wherein dot11BeaconPeriod is a beacon period.

\* \* \* \* \*

UNITED STATES PATENT AND TRADEMARK OFFICE
CERTIFICATE OF CORRECTION

PATENT NO. : 10,856,210 B2
APPLICATION NO. : 16/503815
DATED : December 1, 2020
INVENTOR(S) : Au Page 1 of 1

It is certified that error appears in the above-identified patent and that said Letters Patent is hereby corrected as shown below:

In the Claims

In Column 19, Lines 10-14, Claim 7, delete:

$$\left\lfloor \frac{T_{busy}}{dot11ChannelUtilizationBeaconIntervals \times dot11BeaconPeriod \times 1024} \times 255 \right\rfloor,$$

And insert:

$$\left\lfloor \frac{T_{busy}}{dot11ChannelUtilizationBeaconInterval \times dot11BeaconPeriod \times 1024} \times 255 \right\rfloor,$$

In Column 21, Lines 1-5, Claim 14, delete:

$$\left\lfloor \frac{T_{busy}}{dot11ChannelUtilizationBeaconIntervals \times dot11BeaconPeriod \times 1024} \times 255 \right\rfloor,$$

And insert:

$$\left\lfloor \frac{T_{busy}}{dot11ChannelUtilizationBeaconInterval \times dot11BeaconPeriod \times 1024} \times 255 \right\rfloor,$$

Signed and Sealed this
Sixth Day of April, 2021

Drew Hirshfeld
*Performing the Functions and Duties of the
Under Secretary of Commerce for Intellectual Property and
Director of the United States Patent and Trademark Office*